(12) United States Patent
Yamashita et al.

(10) Patent No.: US 10,399,567 B2
(45) Date of Patent: Sep. 3, 2019

(54) VEHICLE TRAVELING CONTROL APPARATUS

(71) Applicant: TOYOTA JIDOSHA KABUSHIKI KAISHA, Toyota-shi, Aichi (JP)

(72) Inventors: Keiji Yamashita, Nisshin (JP); Takeshi Inoguchi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/691,083

(22) Filed: Aug. 30, 2017

(65) Prior Publication Data

US 2018/0079410 A1 Mar. 22, 2018

(30) Foreign Application Priority Data

Sep. 20, 2016 (JP) ................. 2016-182569

(51) Int. Cl.
*B60W 30/14* (2006.01)
*B60W 10/04* (2006.01)
*B60W 10/18* (2012.01)
*B60W 50/14* (2012.01)
*B60W 50/00* (2006.01)

(52) U.S. Cl.
CPC .......... *B60W 30/146* (2013.01); *B60W 10/04* (2013.01); *B60W 10/18* (2013.01); *B60W 30/143* (2013.01); *B60W 50/14* (2013.01); B60W 2050/0066 (2013.01); B60W 2050/146 (2013.01); B60W 2540/04 (2013.01); B60W 2550/22 (2013.01); B60W 2550/402 (2013.01); B60W 2710/09 (2013.01); B60W 2710/18 (2013.01); B60W 2720/10 (2013.01)

(58) Field of Classification Search
CPC .... B60W 30/146; B60W 10/04; B60W 10/18; B60W 30/143; B60W 50/14; B60W 2720/10; B60W 2050/146; B60W 2050/0066; B60W 2540/04; B60W 2550/22; B60W 2710/09; B60W 2710/18; B60W 2550/402
USPC ............................................ 701/93
See application file for complete search history.

(56) References Cited

U.S. PATENT DOCUMENTS 5,529,139 A * 6/1996 Kurahashi .......... B60K 31/0008
180/169
2012/0241235 A1* 9/2012 Shintani ................ E02F 3/7609
180/68.1

(Continued)

FOREIGN PATENT DOCUMENTS

| JP | 2004-114988 A | 4/2004 |
| JP | 2009-214800 A | 9/2009 |
| JP | 2010-111260 A | 5/2010 |

(Continued)

*Primary Examiner* — Muhammad Shafi
(74) *Attorney, Agent, or Firm* — Oliff PLC

(57) ABSTRACT

After a push operation of an operating unit is started (at time t1), when a speed limit acquired by a speed limit acquisition ECU is switched from a first speed limit (for example, 100 km/h) to a second speed limit (for example, 120 km/h) at time t2 in a period in which a duration time of the push operation has not yet reached a long-push completion time, a driving support ECU sets a target speed Vset to the second speed limit at a time point at which the duration time of the push operation has reached the long-push completion time thereafter (at time t3).

10 Claims, 23 Drawing Sheets

(56) References Cited

U.S. PATENT DOCUMENTS

2012/0253628 A1* 10/2012 Maruyama .......... B60W 50/085
  701/93
2016/0023656 A1* 1/2016 Matsumura ......... B60W 30/143
  701/93

FOREIGN PATENT DOCUMENTS

| JP | 2012-086803 A | 5/2012 |
| JP | 2012-197076 A | 10/2012 |
| JP | 2012-206594 A | 10/2012 |
| JP | 2012-224247 A | 11/2012 |

* cited by examiner

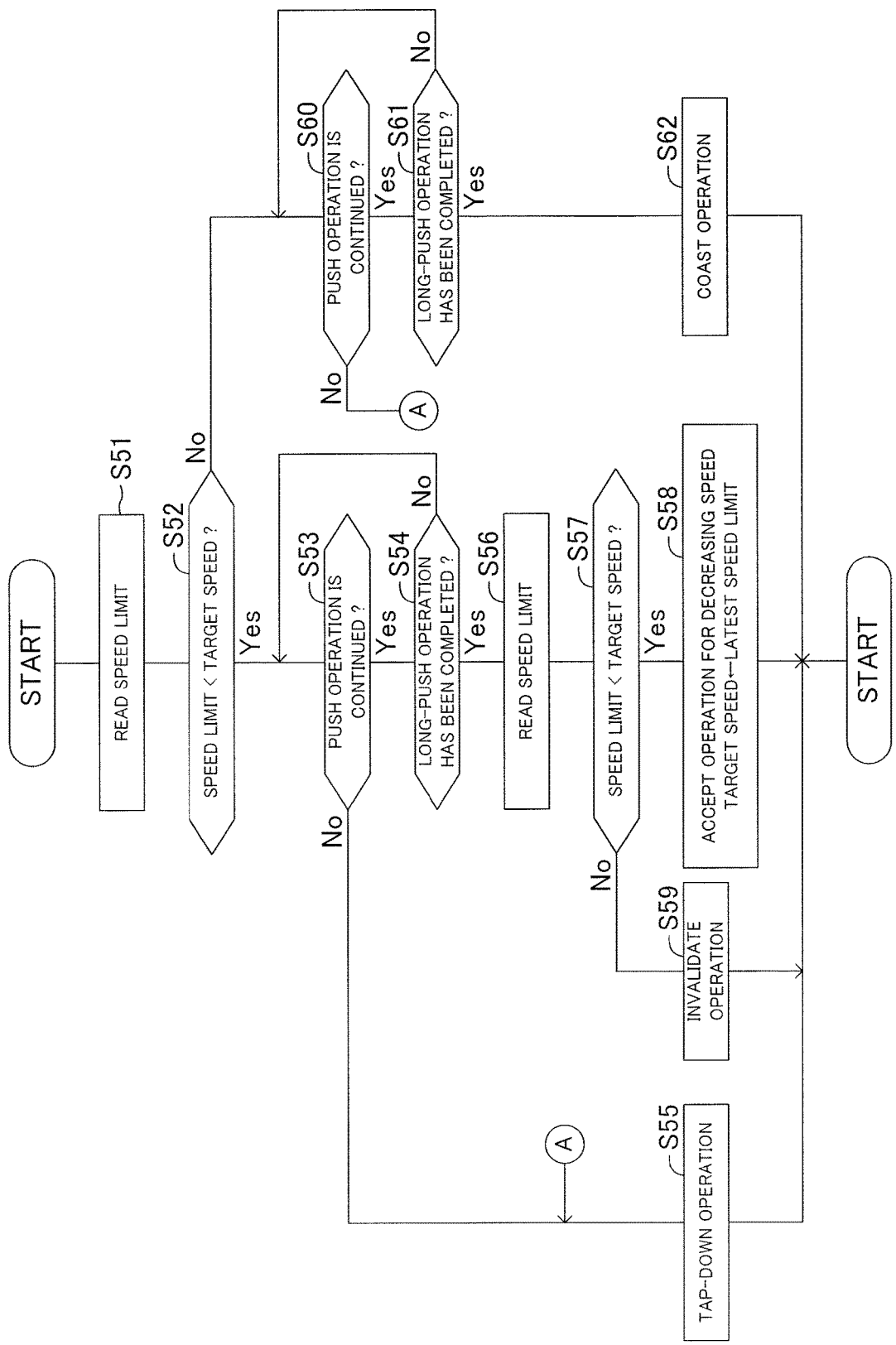

FIG. 8

UPWARD LONG-PUSH OPERATION

|  |  | AT TIME OF COMPLETION OF LONG-PUSH | | |
|---|---|---|---|---|
|  |  | Vlim2: UNRECOGNIZED | $Vlim2 \leq Vset$ | $Vlim2 > Vset$ |
| AT TIME OF STARTING OPERATION | Vlim1: UNRECOGNIZED | ACCELERATION | ACCELERATION | ACCELERATION |
|  | $Vlim1 \leq Vset$ | ACCELERATION | ACCELERATION | ACCELERATION |
|  | $Vlim1 > Vset$ | INVALIDATE OPERATION | INVALIDATE OPERATION | ACCEPT |

------ DRIVER'S INTENTION IS ACCEPT OPERATION

------ DRIVER'S INTENTION IS ACCELERATION OPERATION

FIG. 9

DOWNWARD LONG-PUSH OPERATION

| | | AT TIME OF COMPLETION OF LONG-PUSH | | |
|---|---|---|---|---|
| | | Vlim2: UNRECOGNIZED | Vlim2 ≧ Vset | Vlim2 < Vset |
| AT TIME OF STARTING OPERATION | Vlim1: UNRECOGNIZED | COAST | COAST | COAST |
| | Vlim1 ≧ Vset | COAST | COAST | COAST |
| | Vlim1 < Vset | INVALIDATE OPERATION | INVALIDATE OPERATION | ACCEPT |

------ DRIVER'S INTENTION IS ACCEPT OPERATION
------ DRIVER'S INTENTION IS COAST OPERATION

UPWARD PUSH OPERATION

<MODIFICATION>

UPWARD PUSH OPERATION

<MODIFICATION>

DOWNWARD PUSH OPERATION

<MODIFICATION>

DOWNWARD PUSH OPERATION

<MODIFICATION>

VEHICLE TRAVELING CONTROL APPARATUS

BACKGROUND OF THE INVENTION

1. Field of the Invention

The present invention relates to a vehicle traveling control apparatus which acquires a speed limit of a road on which an own vehicle travels and controls travel of the own vehicle based on the speed limit.

2. Description of the Related Art

One of vehicle traveling control apparatuses that are conventionally known acquires a speed limit of a road on which an own vehicle travels and sets a target speed of the own vehicle to the speed limit, and thereby to keep the own vehicle traveling at a constant speed which is equal to the speed limit. Such a vehicle traveling control apparatus acquires the speed limit of the road on which the own vehicle travels, by obtaining an image of a road sign ahead of the own vehicle with a camera, or based on speed limit information included in map data of a navigation apparatus.

When a vehicle travel control apparatus has own vehicle travel at a constant speed, it is not necessarily preferable to have the vehicle traveling at the speed limit. For this reason, for example, an apparatus (hereinafter, referred to as a "conventional apparatus 1") disclosed in Japanese Patent Application Laid-Open (kokai) 2012-224247 A is configured to enable a driver to select whether or not the target speed of the own vehicle is set to the speed limit, by a switch operation of the driver. In the conventional apparatus 1, when a long-push operation of the operation switch (i.e., an operation to continuously press the operation switch for a certain period of time) is detected, the target speed of the own vehicle is set to the speed limit.

Therefore, when implementing the constant speed control, the driver performs/conducts the long-push operation of the operation switch to thereby keep the own vehicle traveling at a constant speed equal to the speed limit.

SUMMARY OF THE INVENTION

A determination as to whether or not the long-push operation has been performed is finalized/completed when the push operation of the operation switch continues for a certain period of time (hereinafter, referred to as a "long-push completion time"). However, the speed limit may be changed during the long-push operation of the driver. That is, there may be a situation where the speed limit recognized by the vehicle traveling control apparatus changes from a first speed limit to a second speed limit before a duration of the push operation reaches the long-push completion time. In this case, if the target speed is set to the first speed limit, the driver may feel discomfort.

For example, when the own vehicle is about to pass through a point/location at which the speed limit is switched, the driver may recognize a road sign which is ahead of the vehicle and indicating the next speed limit (second speed limit) prior to a time point at which the vehicle traveling control apparatus recognizes the same. In this case, the driver expects that the target speed will be set to the second speed limit, and starts to perform the long-push operation of the operation switch. However, if the target speed is set to the first speed limit which is recognized by the vehicle traveling control apparatus when an operation for the long-push operation is started, the driver may feel discomfort.

It should be noted that the conventional apparatus 1 updates a point on a map at which the speed limit is switched by monitoring whether or not the driver has performed the long-push operation, thereby to improve the positional accuracy of the point at which the speed limit is switched. That is, the conventional apparatus 1 detects a position of the own vehicle when the driver performs the long-push operation, and updates the point (estimated point) on the map at which the speed limit is switched in such a manner that the estimated point is changed to match with the detected position. Therefore, in the conventional apparatus 1, a case in which the speed limit recognized by the apparatus changes during the long-push operation does not occur. In addition, the conventional apparatus 1 does not recognize such a problem caused by the change in the speed limit.

The present invention is made to cope with the problem described above. That is, one of objects of the present invention is to reduce discomfort on the driver when a change in the speed limit is detected during the long-push operation of the operation switch.

In order to achieve the object described above, a vehicle traveling control apparatus according to the present invention includes:

travel controlling means (30, 40) for controlling a driving force and a braking force of an own vehicle to keep the own vehicle traveling at a constant speed in accordance with a target speed without an accelerator pedal operation by a driver;

speed limit acquisition means (20, 21, 22) for acquiring a speed limit of a road on which the own vehicle travels;

an operating unit (70) which is operated by the driver; and target speed setting means (10) for setting the target speed to the speed limit when a long-push operation which is a push operation of the operating unit continued for a long-push completion time or more is detected in a situation in which the speed limit acquired by the speed limit acquisition means and the current target speed are different from each other, wherein the target speed setting means includes speed limit selecting means.

The speed limit selecting means is configured as follows.

When the speed limit is switched from a first speed limit to a second speed limit in a period in which a push operation of the operating unit is being detected and a duration time of the push operation has not yet reached the long-push completion time, the speed limit selecting means selects the second speed limit to set the target speed to the second speed limit at a time point at which the duration time of the push operation has reached the long-push completion time, thereafter (S38, S58).

The vehicle traveling control apparatus includes the travel controlling means for controlling the driving force and the braking force of the own vehicle so as to keep the own vehicle traveling at the constant speed in accordance with (equal to) the target speed without the accelerator pedal operation by the driver. The vehicle traveling control apparatus is configured to set the target speed to the speed limit through (using) an operation of the driver. For this reason, the vehicle traveling control apparatus includes the speed limit acquisition means, the operating unit, and the target speed setting means.

The speed limit acquisition means acquires the speed limit of the road on which the own vehicle is traveling. The target speed setting means sets the target speed to the speed limit (new target speed) when a long-push operation which is a push operation of the operating unit continued for a long-push completion time or more is detected in a situation in which the speed limit acquired by the speed limit acquisition means and the current target speed are different from each other. Accordingly, the driver can perform/conduct the long-push operation of the operating unit to keep the own vehicle traveling at a constant speed equal to the current speed limit acquired by the speed limit acquisition means.

In this configuration, for example, the vehicle traveling control apparatus may include notification means for notifying the driver of a situation in which the speed limit acquired by the speed limit acquisition means and the current target speed are different from each other.

The speed limit may change while the driver is performing the long-push operation. That is, while the operation of the operating unit for the long-push operation is being conducted (i.e., the long-push operation is being performed), the speed limit acquired by the speed limit acquisition means may change. In this case, when the driver starts the long-push operation of the operating unit in a situation in which the driver recognizes the next (preceding) speed limit earlier than (prior to a time point at which) the speed limit acquisition means recognizes it, the driver may feel discomfort if the target speed is set to the speed limit acquired by the speed limit acquisition means up to the start of the long-push operation. Therefore, in order to address this problem, the target speed setting means includes the speed limit selecting means.

When the speed limit changes from the first speed limit to the second speed limit in a period in which the push operation of the operating unit is being detected and the duration time of the push operation has not yet reached the long-push completion time, the speed limit selecting means selects the second speed limit to set the target speed to the second speed limit (new target speed) at a time point at which the duration time of the push operation has reached the long-push completion time.

Therefore, according to the present invention, in the case where the change in the speed limit occurs during the long-push operation of the operating unit (e.g., of an operating switch), it is possible to reduce discomfort on the driver.

In an aspect of the present invention, the travel controlling means includes a cruise control function for keeping the own vehicle traveling at the constant speed in accordance with the target speed set arbitrarily by the driver, the operating unit serves as both a target speed setting operating unit for increasing or decreasing the target speed for the cruise control function by a push operation, and a permission operating unit for permitting setting the target speed to the speed limit by the long-push operation, and the target speed setting means is configured to prohibit the speed limit selecting means from setting the target speed to the second speed limit, when the second speed limit is lower than the current target speed and the long-push operation of the operating unit toward a side for increasing the target speed for the cruise control function is detected (S37: No, S39).

In an aspect of the present invention, the travel controlling means has the cruise control function for keeping the own vehicle traveling at the constant speed in accordance with the target speed set arbitrarily by the driver. Further, the operating unit serves as both the target speed setting operating unit for increasing or decreasing the target speed for the cruise control function by the push operation, and the permission operating unit for permitting setting the target speed to the speed limit (new target speed) by the long-push operation. For example, the operating unit has a function to increase the target speed for the cruise control by the push operation in a first direction, and a function to decrease the target speed for the cruise control by the push operation in a second direction.

In a case where the operating unit is operated for the long-push operation toward the side for increasing the target speed for the cruise control, the target speed can be set to a vehicle speed which is along with the intention of the driver or close to the intention of the driver by increasing the target speed up to the speed limit. On other hand, when the speed limit is changed to a speed limit lower than the current target speed while the driver is performing the long-push operation of the operating unit toward the side (for example, in the first direction) for increasing the target speed, the target speed may be set to a speed which is not along with the driver's intention if the speed limit lower than the current target speed is set as a new target speed.

For this reason, in a case where the second speed limit is lower than the current target speed, the target speed setting means is configured to prohibit the speed limit selecting means from setting the target speed to the second speed limit (new target speed) when the long-push operation of the operating unit toward the side for increasing the target speed for the cruise control function is detected. Therefore, according to the aspect of the present invention, it is possible to further reduce discomfort on the driver. It should be noted that, the expression "prohibit" means that the target speed is not set to the second speed limit in the above-mentioned situation (in which the second speed limit is lower than the current target speed and the long-push operation of the operating unit toward the side for increasing the target speed for the cruise control function is detected), and does not necessarily mean that prohibiting the target speed from being set to the second speed limit continues after the situation.

It should be noted that, in the case where the second speed limit is higher than the current target speed, the target speed setting means may be configured to prohibit the speed limit selecting means from setting the target speed to the second speed limit when the long-push operation of the operating unit toward a side for decreasing the target speed for the cruise control function is detected (S57: No, S59). According to this configuration, it is possible to further reduce discomfort on the driver.

In an aspect of the present invention, in a case where the first speed limit is higher than the current target speed and the second speed limit is lower than the current target speed, the target speed setting means is configured to set the target speed to the first speed limit when the long-push operation of the operating unit toward the side for increasing the target speed for the cruise control function is detected, and thereafter, when the push operation of the operating unit continues for a predetermined extension time or more, the target speed setting means is configured to set the target speed to the second speed limit (FIG. 11C).

In an aspect of the present invention, in a case where the first speed limit is higher than the current target speed and the second speed limit is lower than the current target speed, the target speed setting means is configured to prohibit the speed limit selecting means from setting the target speed to the second speed limit, and to set the target speed to the first speed limit (new target speed) when the long-push operation of the operating unit toward the side for increasing the target speed for the cruise control function is detected. Thereafter, if the long-push operation of the operating unit is continued, it can be inferred that the driver is operating the operating unit with the intention to set the target speed to the latest speed limit (the second speed limit). Therefore, in the case where the push operation of the operating unit continues for the predetermined extension time after the long-push operation is detected, the target speed setting means sets the target speed to the second speed limit (new target speed). Thus, according to this aspect of the invention, it is possible to successfully reflect the intention of the driver to set the target speed to the latest speed limit.

It should be noted that, in a case where the first speed limit is lower than the current target speed and the second speed limit is higher than the current target speed, the target speed setting means may be configured to set the target speed to the first speed limit when the long-push operation of the operating unit toward the side for decreasing the target speed for the cruise control function is detected, and thereafter, when the push operation of the operating unit continues for the predetermined extension time or more, the target speed setting means may be configured to set the target speed to the second speed limit (FIG. 16C).

According to this aspect of the invention, it is also possible to successfully reflect the intention of the driver to set the target speed to the latest speed limit.

Regarding an aspect of the present invention, in a case where the operating unit is used as the target speed setting operating unit for the cruise control function, the operating unit includes:

a function to gradually increase the target speed as long as the push operation is continuing after the long-push operation for the long-push completion time is detected, with respect to the long-push operation toward the side for increasing the target speed for the cruise control function; and a function to gradually decrease the target speed as long as the push operation is continuing after the long-push operation for the long-push completion time is detected, with respect to the long-push operation toward a side for decreasing the target speed for the cruise control function, and when the first speed limit is lower than the current target speed and the long-push operation toward the side for increasing the target speed for the cruise control function is detected, even in a case where the second speed limit is higher than the current target speed, the target speed setting means is configured to prohibit the speed limit selecting means from setting the target speed to the second speed limit, and to gradually increase the target speed from the current target speed as long as the push operation is continuing after the long-push operation for the long-push completion time is detected (S42, FIG. 8, and FIG. 13).

Regarding the above aspect of the present invention, when the operating unit is used as the target speed setting operating unit for the cruise control function, the operating unit includes the function to gradually increase or decrease the target speed by the long-push operation. In this configuration, with respect to the long-push operation toward the side (for example, the first direction) for increasing the target speed for the cruise control function, the target speed is gradually increased as long as the push operation is continuing after the long-push operation for the long-push completion time is detected. Further, with respect to the long-push operation toward the side (for example, the second direction) for decreasing the target speed for the cruise control function, the target speed is gradually decreased as long as the push operation is continuing after the long-push operation for the long-push completion time is detected.

In the situation in which the speed limit is lower than the current target speed, when the long-push operation toward the side for increasing the target speed is started, it can be inferred that the push operation is based on the driver's intention to gradually increase the target speed. Therefore, when the speed limit changes to a speed limit higher than the current target speed in the middle of the long-push operation, if the target speed is set to the latest speed limit, the target speed may be set to a speed which is not along with the driver's intention.

In view of the above, in the aspect of the present invention, when the first speed limit is lower than the current target speed and the long-push operation toward the side (for example, in the first direction) for increasing the target speed for the cruise control function is detected, even in a case where the second speed limit is higher than the current target speed, the target speed setting means is configured to prohibit the speed limit selecting means from setting the target speed to the second speed limit, and to gradually increase the target speed from the current target speed as long as the push operation is continuing after the long-push operation for the long-push completion time is detected.

According to the aspect of the present invention, it is possible to further reduce discomfort on the driver. Further, since the driver can determine the target speed depending on the long-push operation time, the convenience is improved.

It should be noted that, when the first speed limit is higher than the current target speed and the long-push operation toward the side for decreasing the target speed for the cruise control function is detected, even in a case where the second speed limit is lower than the current target speed, the target speed setting means may be configured to prohibit the speed limit selecting means from setting the target speed to the second speed limit, and to gradually decrease the target speed from the current target speed as long as the push operation is continuing after the long-push operation for the long-push completion time is detected (S62, FIG. 9, and FIG. 18).

According to this configuration, it is also possible to further reduce discomfort on the driver. Further, the convenience is improved.

In an aspect of the present invention, the vehicle traveling control apparatus further includes reliability-degree determining means (20) for determining whether or not a degree of reliability of the speed limit acquired by the speed limit acquisition means is lower than a reference level, in a case where it is determined that the degree of reliability of the speed limit is lower than the reference level in a period in which the push operation of the operating unit is being detected and the duration time of the push operation has not yet reached the long-push completion time, the target speed setting means is configured to invalidate the long-push operation of the operating unit when the duration time of the push operation has reached the long-push completion time, thereafter (S39, S59, FIGS. 8, 9, 12A, and 17A).

In the above aspect of the present invention, the reliability-degree determining means determines whether or not the degree of reliability of the speed limit acquired by the speed limit acquisition means is lower than the reference level. For example, when the own vehicle turns right or left at an intersection, there is a possibility that the speed limit is changed. In addition, if the travel distance of the own vehicle after detecting a speed limit sign at the previous timing exceeds a predetermined distance (reliability determination distance), there is a possibility that the speed limit is changed. Therefore, when these situations and the like are detected, it can be determined that the degree of reliability of the speed limit becomes lower than the reference level.

Therefore, when it is determined that the degree of reliability of the speed limit is lower than the reference level in the period in which the push operation of the operating unit is being detected and the duration time of the push operation has not yet reached the long-push completion time, the target speed setting means is configured to invalidate the long-push operation of the operating unit when the duration time of the push operation has reached the long-push completion time, thereafter. Thus, the target speed setting means does not set the target speed to the speed limit. This configuration can avoid a situation that the target speed is set to a speed limit having the low reliability. Accordingly, it is possible to reduce the inconvenience that the target speed is set to an erroneous speed limit to thereby give discomfort to the driver.

In an aspect of the present invention, when a magnitude relationship of the first speed limit with respect to the current target speed and a magnitude relationship of the second speed limit with respect to the current target speed are different from each other ((S32: Yes, S37: No), (S52: Yes, S57: No)), the target speed setting means is configured to prohibit the speed limit selecting means from setting the target speed to the second speed limit (S39, S59, FIGS. 8 and 9).

When the speed limit changes from a value higher than the current target speed to a value lower than the current target speed while the driver is conducting the long-push operation, or when the speed limit changes from a value lower than the current target speed to a value higher than the current target speed while the driver is conducting the long-push operation, the target speed may be set to a speed which is not along with the driver's intention if the target speed is set to the speed limit after the change. In view of the above, when the magnitude relationship of the first speed limit with respect to the current target speed and the magnitude relationship of the second speed limit with respect to the current target speed are different from each other (that is, when the first speed limit is higher than the current target speed and the second speed limit is lower than the current target speed, or when the first speed limit is lower than the current target speed and the second speed limit is higher than the current target speed), the target speed setting means is configured to prohibit the speed limit selecting means from setting the target speed to the second speed limit (new target speed). Therefore, according to this aspect of the present invention, it is possible to further reduce discomfort on the driver.

Further, the present invention may be a vehicle traveling control apparatus for setting an upper speed limit of an own vehicle to a speed limit. This vehicle traveling control apparatus includes:

travel controlling means (30, 40) for controlling a driving force and a braking force of an own vehicle in such a manner that a vehicle speed of the own vehicle does not exceed an upper speed limit;

speed limit acquisition means (20, 21, 22) for acquiring a speed limit of a road on which the own vehicle travels;

an operating unit (70') which is operated by the driver; and upper speed limit setting means (10') for setting the upper speed limit to the speed limit when a long-push operation continued for a long-push completion time or more of the operating unit is detected in a situation in which the speed limit acquired by the speed limit acquisition means and the current upper speed limit are different from each other, wherein the upper speed limit setting means includes speed limit selecting means.

In a case where the speed limit acquired by the speed limit acquisition means is switched from a first speed limit to a second speed limit in a period in which a push operation of the operating unit is being detected and a duration time of the push operation has not yet reached the long-push completion time, the speed limit selecting means selects the second speed limit to set the target speed to the second speed limit when the duration time of the push operation has reached the long-push completion time, thereafter (S38, S58).

The vehicle traveling control apparatus according to the present invention includes the travel controlling means for controlling the driving force and the braking force of the own vehicle in such a manner that the vehicle speed of the own vehicle does not exceed the upper speed limit. Further, the vehicle traveling control apparatus is configured to set the upper speed limit to the speed limit by an operation of the driver. For this reason, the vehicle traveling control apparatus includes the speed limit acquisition means, the operating unit, and the upper speed limit setting means. The speed limit acquisition means acquires the speed limit of the road on which the own vehicle travels.

The upper speed limit setting means sets the upper speed limit to the speed limit (new upper speed limit) when the long-push operation which is a push operation of the operating unit continued for the long-push completion time or more is detected in the situation in which the speed limit acquired by the speed limit acquisition means and the current upper speed limit are different from each other. In this configuration, the driver may perform/conduct the long-push operation of the operating unit to travel the own vehicle in such a manner that the vehicle speed of the own vehicle does not exceed the upper speed limit in accordance with the current speed limit acquired by the speed limit acquisition means.

In this configuration, for example, the vehicle traveling control apparatus may include notification means for notifying the driver of a situation in which the speed limit acquired by the speed limit acquisition means and the upper speed limit (the current upper speed limit) are different from each other.

The speed limit may change while the driver performs the long-push operation. That is, while the long-push operation of the operating unit is being performed, the speed limit acquired by the speed limit acquisition means may change. In this case, when the driver starts the long-push operation of the operating unit in a situation in which the driver recognizes the next (preceding) speed limit earlier than (prior to a time point at which) the speed limit acquisition means recognizes the next speed limit, the driver may feel discomfort if the upper speed limit is set to the speed limit up to the time point of starting the long-push operation. Therefore, in order to address this problem, the upper speed limit setting means includes the speed limit selecting means.

When the speed limit acquired by the speed limit acquisition means is switched from a first speed limit to a second speed limit in a period in which a push operation of the operating unit is being detected and a duration time of the push operation has not yet reached the long-push completion time, the speed limit selecting means selects the second speed limit to set the upper speed limit to the second speed limit (new upper speed limit) at a time point at which the duration time of the push operation has reached the long-push completion time.

Therefore, according to the present invention, in a case where the change in the speed limit is detected during the long-push operation of the operating unit, it is possible to reduce discomfort on the driver.

In the above description, references used in the following descriptions regarding embodiments are added with parentheses to the elements of the present invention, in order to assist in understanding the present invention. However, those references should not be used to limit the scope of the invention.

BRIEF DESCRIPTION OF THE DRAWINGS

FIG. 7 is a flowchart illustrating a process routine executed in accordance with an operation in a downward direction (downward operation correspondence process).

FIG. 8 is a diagram illustrating functions of the cruise operating unit when the long-push operation in an upward direction is performed.

FIG. 9 is a diagram illustrating functions of the cruise operating unit when the long-push operation in a downward direction is performed.

DETAILED DESCRIPTION OF THE EMBODIMENTS

Figure 1:
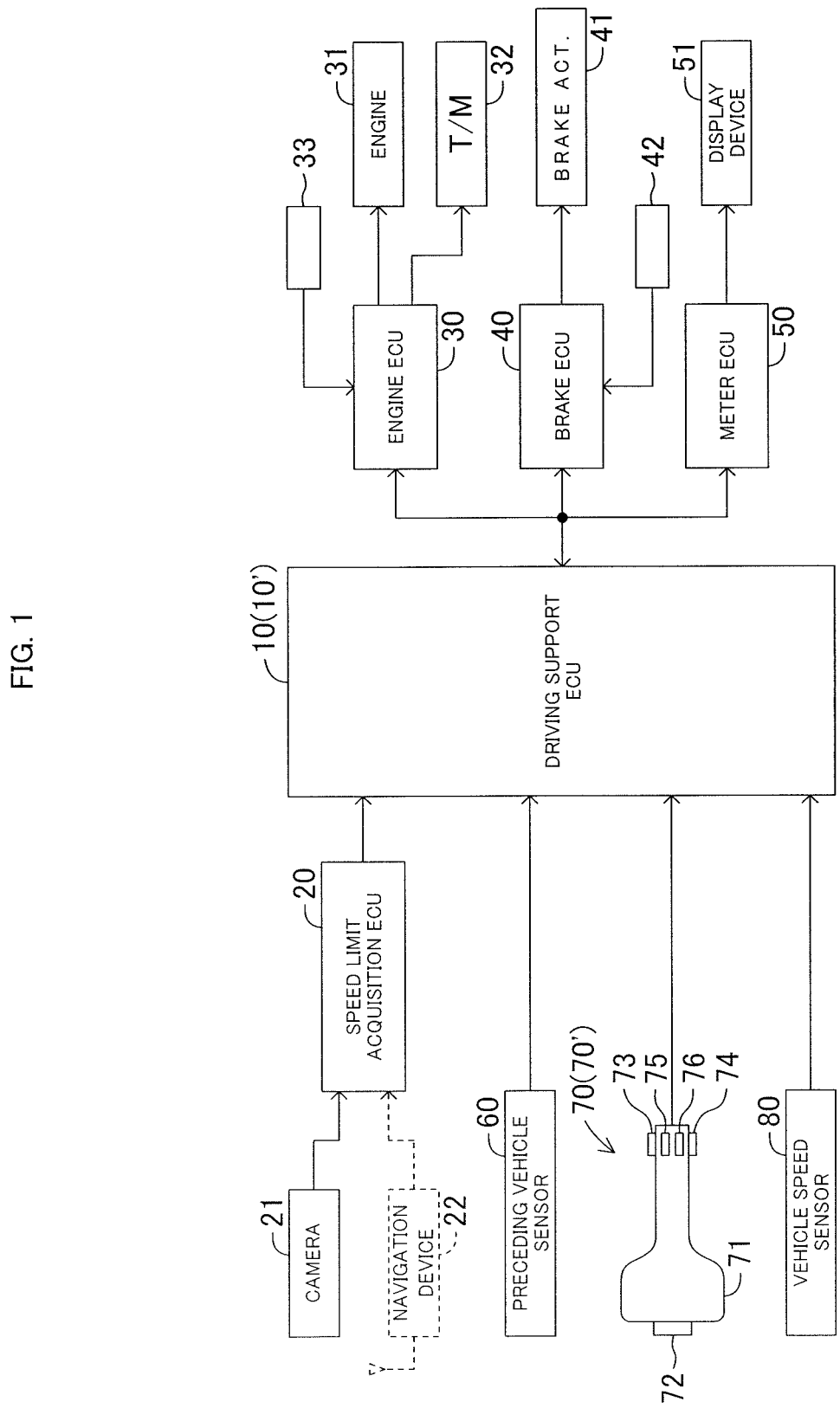
FIG. 1 is a schematic configuration diagram of a vehicle traveling control apparatus according to the present embodiment.

A vehicle traveling control apparatus according to the present invention will next be described with reference to the drawings. FIG. 1 is a schematic configuration diagram of a vehicle traveling control apparatus according to the present embodiment.

The vehicle traveling control apparatus according to the present embodiment is a driving support/assist system for implementing RSA-ACC (Road Sign Assist-Adaptive Cruise Control). The RSA-ACC is a driving support/assist control in which a function for setting a target speed to a speed limit is additionally provided to a cruise control provided with an inter-vehicle control function (hereinafter, referred to as "ACC"). The ACC is a driving support/assist control including (i) a constant speed control (CC: Cruise Control) which keeps an own vehicle traveling at a certain constant speed in accordance with (or equal to) a target speed (so called "set vehicle speed") set arbitrarily by a driver, and further including (ii) an inter-vehicle control to enable the own vehicle to follow a preceding vehicle so as to keep an inter-vehicle distance between the own vehicle and the preceding vehicle at a predetermined distance. Therefore, when the RSA-ACC is implemented, it is possible to drive the own vehicle at a constant speed in accordance with (i.e., set to be equal to) the speed limit without requiring an accelerator pedal operation by the driver.

When the RSA-ACC is implemented, a speed limit of a road on which the own vehicle is traveling is acquired in real time. During the execution of the RSA-ACC, if the acquired speed limit differs from the current target speed, the driver is notified of that situation/fact. When the driver performs a specific operation for acceptance/permission (that is, when the driver performs an acceptance-response-operation) in response to the notification, the target speed is set to the speed limit (i.e., the target speed is made equal to the speed limit).

A configuration of the vehicle traveling control apparatus will be described below.

As illustrated in FIG. 1, the vehicle traveling control apparatus includes a driving support (assist) ECU 10, a speed limit acquisition ECU 20, an engine ECU 30, a brake ECU 40, and a meter ECU 50. Each of these ECUs is an electric control unit including a microcomputer as a main part. In addition, these ECUs are connected with each other so as to transmit and receive information via a CAN (Controller Area Network). In the present specification, the microcomputer includes a CPU, a ROM, a RAM, a non-volatile memory, an interface I/F, and the like. The CPU is configured to implement various functions by executing instructions (programs, routines) stored in the ROM. In the present embodiment, the driving support ECU 10 and the engine ECU 30 are provided separately, but the engine ECU 30 may include the functions of the driving support ECU 10.

The speed limit acquisition ECU 20 is the electric control unit which acquires a speed limit of a road on which the own vehicle is traveling currently, and is connected to an in-vehicle camera 21. The in-vehicle camera 21 takes an image ahead of the vehicle, and transmits the obtained image information to the speed limit acquisition ECU 20. The speed limit acquisition ECU 20 has an image analysis function. The speed limit acquisition ECU 20 receives the image information output from the in-vehicle camera 21, recognizes a road sign (or a road mark) from the image information, and detects the speed limit (legal speed limit) indicated by the road sign. Accordingly, while the vehicle travels, the speed limit acquisition ECU 20 constantly receives the image information transmitted from the in-vehicle camera 21, analyzes the image information, and acquires (recognizes) the speed limit indicated by the road sign positioned ahead of the own vehicle.

In order to acquire the speed limit, a navigation apparatus 22 (illustrated by a broken line in FIG. 1) can be used in place of (or in addition to) the in-vehicle camera 21. The navigation apparatus 22 includes a GPS receiver for detecting a position of the own vehicle, a storage device for storing map information and road information, and a communication device for acquiring the latest map information and the latest road information from outside. The road information includes speed limit information. The navigation apparatus 22 may extract the speed limit information indicating the speed limit of the road on which the own vehicle is currently traveling based on a current position of the own vehicle on the map and the road information, and may output the extracted speed limit information to the speed limit acquisition ECU 20.

It should be noted that the navigation apparatus 22 may not be provided with the storage apparatus for storing the map information and the road information. For example, the navigation apparatus 22 may include a wireless communication terminal which receives the latest map information and the latest road information whenever necessary from an external information providing apparatus (infrastructure facility).

When the speed limit acquisition ECU 20 acquires the speed limit in this manner, the speed limit acquisition ECU 20 outputs/transmits the acquired speed limit to the driving support ECU 10.

The driving support ECU 10 is connected to a preceding vehicle sensor 60, a cruise operating unit/element 70, and a vehicle speed sensor 80.

The preceding vehicle sensor 60 has a function for acquiring information on the preceding vehicle (existing) ahead of the own vehicle, and, for example, includes a radar sensor and a camera. As the preceding vehicle sensor 60, other and various configurations may be used as long as the preceding vehicle can be detected and the distance between the own vehicle and the preceding vehicle can be detected. The preceding vehicle sensor 60 does not necessarily include both the radar sensor and the camera, but may include at least one of the radar sensor and the camera. Further, the preceding vehicle sensor 60 may include other sensors.

For example, the radar sensor irradiates a radio wave in the millimeter wave band in a forward direction, and in a case where a preceding vehicle exists, the radar sensor receives a reflected wave from the preceding vehicle. Then, based on the irradiation timing and the reception timing of the radio wave and the like, the radar sensor determines the presence or absence of a preceding vehicle, and calculates a distance between the own vehicle and the preceding vehicle (referred to as a "preceding vehicle inter-vehicle distance"), a relative speed between the own vehicle and the preceding vehicle (referred to as a "preceding vehicle relative speed"), and the like. The radar sensor outputs these calculation results to the driving support ECU 10. The camera is, for example, a stereo camera, and takes images of left and right landscapes ahead of the own vehicle. Based on the taken image data of the left and right sides, the camera determines the presence or absence of the preceding vehicle, and calculates the preceding vehicle inter-vehicle distance, the preceding vehicle relative speed, and the like. The camera outputs these calculation results to the driving support ECU 10. Hereinafter, information representing the presence or absence of the preceding vehicle, the preceding vehicle inter-vehicle distance, the preceding vehicle relative speed, and the like is referred to as "preceding vehicle information".

Figure 2:
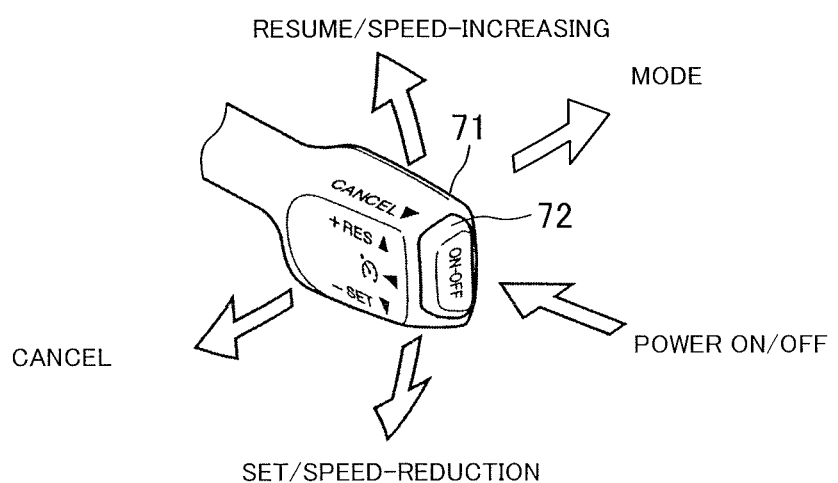
FIG. 2 is an explanatory drawing illustrating operation directions of a cruise operating unit.

The cruise operating unit 70 is provided with an operation lever 71. A base portion of the operation lever 71 is attached to a back side of a steering wheel, and an end portion of the operation lever 71 extends toward the outside in the radial direction of the steering wheel. As illustrated in FIG. 2, the end portion of the operation lever 71 is provided so as to swingably move upward, downward, frontward (rearward of the vehicle), and backward (forward of the vehicle) as seen from the driver.

The cruise operating unit 70 includes a main switch 72 provided at the end portion of the operation lever 71, a resume/speed-increasing switch 73, a set/speed-reduction switch 74, a cancel switch 75, and a mode switch 76. The resume/speed-increasing switch 73, the set/speed-reduction switch 74, the cancel switch 75, and the mode switch 76 can be turned ON by operation of the operation lever 71. Hereinafter, the operation direction of the cruise operating unit 70 means a direction viewed from the driver sitting on a driver's seat.

In the cruise operating unit 70, except for the main switch 72, one the switches which is being pushed in the operation direction turns ON only while the operation lever 71 is being operated by the driver. When the driver releases his/her hand from the operation lever 71, the operation lever 71 returns to an initial position so that each of the switches 73, 74, 75, and 76 turns OFF. In the present embodiment, as illustrated in FIG. 2, when the end portion of the operation lever 71 is pushed upward, the resume/speed-increasing switch 73 turns ON. When the end portion of the operation lever 71 is pushed downward, the set/speed-reduction switch 74 turns ON. When the end portion of the operation lever 71 is drawn to the near side (driver's side), the cancel switch 75 turns ON. When the end portion of the operation lever 71 is pushed backward (forward of the vehicle), the mode switch 76 turns ON. Furthermore, the main switch 72 is a main power switch whose ON/OFF state is alternately switched every time the push operation is performed.

The driving support ECU 10 is configured such that, only when the main switch 72 of the cruise operating unit 70 is in the ON state, the switch (the resume/speed-increasing switch 73, the set/speed-reduction switch 74, the cancel switch 75, or the mode switch 76) can function so as to be turned ON/OFF in response to the push operation of the operation lever 71.

When the main switch 72 is in the ON-state and the target speed has not been set yet, the driving support ECU 10 sets the target speed to an actual vehicle speed (i.e., vehicle speed detected by the vehicle speed sensor 80) at the time point at which the set/speed-reduction switch 74 is turned OFF after the set/speed-reduction switch 74 is turned ON. The driving support ECU 10 stores the target speed on the memory. In addition, when the set/speed-reduction switch 74 is turned ON in the case where the target speed has been set, the driving support ECU 10 decreases the target speed by a decrease width/amount corresponding to one lever-operation (push-operation) duration time.

For example, when the operation lever 71 is pushed downward momentarily (when the ON-duration time of the set/speed-reduction switch 74 is less than a predetermined time (for example, 0.6 seconds)), the driving support ECU 10 decreases the target speed by a predetermined speed (for example, 1 km/h) which is a small decrease width/amount. Hereinafter, this operation may be referred to as a "tap-down operation". Further, when the operation lever 71 has been pushed downward continuously for a predetermined time or more (when the ON-duration time of the set/speed-reduction switch 74 is equal to or longer than the predetermined time (for example, 0.6 seconds)), the driving support ECU 10 gradually (at a predetermined cycle) decreases the target speed by a predetermined speed interval (for example, 5 km/h) which is a large decrease width/amount while the operation lever 71 is being pushed (while the set/speed-reduction switch 74 is in the ON-state). As this operation gradually decelerates the own vehicle, this operation may be hereinafter referred to as a "coast operation".

When the resume/speed-increasing switch 73 is turned ON while the target speed has been set, the driving support ECU 10 increases the target speed by an increase width/amount corresponding to one-lever operation (push-operation) duration time. For example, when the operation lever 71 is momentarily pushed upward (when the ON-duration time of the resume/speed-increasing switch 73 is less than a predetermined time (for example, 0.6 seconds)), the driving support ECU 10 increases the target speed by a predetermined speed (for example, 1 km/h) which is a small increase width/amount for one lever operation. Hereinafter, this operation may be referred to as a "tap-up operation".

Further, when the operation lever 71 is pushed upward continuously for a predetermined time or more (when the ON-duration time of the resume/speed-increasing switch 73 is equal to or longer than a predetermined time (for example, 0.6 seconds)), the driving support ECU 10 gradually (at a predetermined cycle) increases the target speed by a predetermined speed interval (for example, 5 km/h) which is a large increase width/amount while the operation lever 71 is being pushed (while the resume/speed-increasing switch 73 is in the ON-state). As this operation gradually accelerates the own vehicle, this operation may be hereinafter referred to as an "acceleration operation".

Hereinafter, regarding the operation of the operation lever 71, the operation for continuously pushing the operation lever 71 for the predetermined time or longer is referred to as a "long-push operation", and the operation for momentarily pushing the operation lever 71 is referred to as a "short-push operation". The driving support ECU 10 measures the ON-duration time of the switch that is turned ON by pushing the operation lever 71 (the ON-duration time being a time for which the pushed switch is continuously in the ON-state). When the ON-duration time is equal to or longer than the predetermined time (hereinafter referred to as a "long-push completion time"), the driving support ECU 10 regards this operation as the long-push operation. On the other hand, when the ON-duration time is less than the long-push completion time, the driving support ECU 10 regards the operation as the short-push operation. Hereinafter, when it is unnecessary to distinguish between the long-push operation and the short-push operation, they are simply referred to as a "push operation" or an "operation".

When the cancel switch 75 is turned ON or the main switch 72 is turned OFF while the traveling control (the inter-vehicle control or the constant speed control) is being performed, the driving support ECU 10 deactivates/terminates the traveling control. When the cancel switch 75 is turned ON, the driving support ECU 10 stores the target speed at that time. When the main switch 72 is turned OFF, the driving support ECU 10 erases the target speed (clear the memory value of the target speed) at that time.

When the resume/speed-increasing switch 73 is turned ON after deactivating the traveling control by turning ON the cancel switch 75, the driving support ECU 10 resumes the traveling control using the target speed which was stored when the cancel switch 75 was turned ON.

In the above manner, the driver uses the cruise operating unit 70 to increase or decrease the target speed (set vehicle speed) for the constant speed control.

The mode switch 76 is a switch for switching a traveling control mode of the (own) vehicle between the inter-vehicle control mode and the constant speed control mode. The mode switch 76 is also a switch which allows the driver to select whether or not to activate a function (called "RSA function") for setting the target speed to the speed limit in each of the inter-vehicle control mode and the constant speed control mode. Therefore, the traveling control mode of the (own) vehicle includes (i) the RSA-ACC mode for executing the inter-vehicle control with the RSA function, (ii) an ACC mode for executing the inter-vehicle control (ACC) without activating the RSA function, (iii) a RSA-CC mode for executing the constant speed control (CC) with the RSA function, and (iv) a CC mode for executing the constant speed control (CC) without activating the RSA function. In the state where the main switch 72 is turned ON, the driving support ECU 10 switches the traveling control mode of the (own) vehicle according to, for example, the number of times indicating how many times the mode switch 76 is pushed, the long-push operation duration time of the mode switch 76, or the like.

When executing the inter-vehicle control (RSA-ACC and ACC), if the preceding vehicle is detected ahead of the own vehicle, the driving support ECU 10 has the own vehicle follow the preceding vehicle while maintaining the distance between the preceding vehicle and the own vehicle at an appropriate distance. If the preceding vehicle is not detected, the driving support ECU 10 keeps the own vehicle traveling at a constant speed corresponding to (or equal to) the target speed. Further, during the execution of the constant speed control (the RSA-CC mode and the CC mode), the driving support ECU 10 keeps the own vehicle traveling at a constant speed corresponding to (or equal to) the target speed.

Further, when the driving support ECU 10 keeps the own vehicle traveling at a constant speed under the execution of either the RSA-ACC mode or the RSA-CC mode, the driving support ECU 10 can set the target speed of the constant speed control to the speed limit which has been recognized by the speed limit acquisition ECU 20. Hereinafter, since there is no need to distinguish between the RSA-ACC and the RSA-CC, they are collectively referred to as a "RSA-ACC". Similarly, since the ACC and the CC do not need to be distinguished from each other, they are collectively referred to as an "ACC".

The cruise operating unit 70 is not only used for setting the ACC such as setting the target speed, but also used as an operating unit for accepting to set the target speed to the speed limit. When the cruise operating unit 70 is operated so as to allow the speed limit to be set as the target speed, the driving support ECU 10 sets the target speed to the speed limit which has been recognized by the speed limit acquisition ECU 20. Such a specific responsive operation (acceptance-response-operation or permission-response-operation) for accepting setting the target speed to the speed limit will be described later.

The engine ECU 30 is connected to various sensors 33 necessary for controlling an engine 31 and controlling a transmission 32. The engine ECU 30 performs a fuel injection control, an ignition control, and an intake air amount control of the engine 31, based on a required driving force. Further, the engine ECU 30 performs a shift control of the transmission 32 based on a shift up line and a shift down line predetermined with respect to the vehicle speed and a throttle opening degree.

The driving support ECU 10 calculates a target acceleration of the own vehicle while either the constant speed control or the inter-vehicle control is being executed. For example, while the driving support ECU 10 is executing the constant speed control, it calculates the target acceleration of the own vehicle in such a manner that the vehicle speed of the own vehicle follows (comes closer to) the target speed, based on the vehicle speed detected by the vehicle speed sensor 80 and the target speed. Further, while the driving support ECU 10 is executing the inter-vehicle control, it calculates the target acceleration of the own vehicle in such a manner that a distance between the own vehicle and the preceding vehicle follows (comes closer to) a target inter-vehicle distance which is set according to the vehicle speed. Then, the driving support ECU 10 calculates a required driving force (including a negative value, that is, a required braking force) necessary to accelerate the own vehicle (or to decelerate the own vehicle when the target acceleration is a negative value) at the calculated target acceleration. The driving support ECU 10 transmits the required driving force to the engine ECU 30.

The engine ECU 30 controls the engine 31 and the transmission 32 according to the required driving force.

When the required driving force has a value requiring a large braking force, and the engine 31 and the transmission 32 alone cannot satisfy the required driving force, the engine ECU 30 transmits a required braking force to the brake ECU 40 so as to compensate for the shortage in the braking force using the hydraulic brake.

The brake ECU 40 is connected to a brake actuator 41. The brake actuator 41 is provided in a hydraulic circuit (not shown) between a master cylinder that pressurizes brake oil by a brake pedal and a wheel cylinder that is built in a brake caliper of each wheel. The brake ECU 40 is connected to various sensors 42 necessary for controlling the brake actuator 41. The brake ECU 40 controls the brake actuator 41 based on the required braking force to generate a frictional braking force on the wheels.

The meter ECU 50 is connected to a display device 51 provided at a visible position from the driver's seat. When performing the RSA-ACC, the driving support ECU 10 transmits to the meter ECU 50 information on the current target speed, the preceding vehicle information including the presence or absence of the preceding vehicle, and information on the speed limit. The meter ECU 50 displays the current target speed on the display device 51 in accordance with the information transmitted from the driving support ECU 10. Further, when the preceding vehicle is detected in the inter-vehicle control mode, the meter ECU 50 displays a mark indicating the presence of the preceding vehicle on the display device 51. The screen thus displayed is called a normal display screen.

When the speed limit and the target speed are different from each other, the driving support ECU 10 transmits to the meter ECU 50 an inquiry display command for displaying an inquiry display screen on the display device 51. Upon receipt of the inquiry display command, the meter ECU 50 displays on the display device 51 the inquiry display screen displaying the speed limit, the target speed, and a mark indicating an operation direction for the specific responsive operation for acceptance (operation direction for the acceptance-response-operation).

Although the RSA-ACC has the function for setting the target speed of the ACC to the speed limit of the road on which the own vehicle is traveling, it is not always preferable to set the target speed to the speed limit, depending on the standpoint of the driver or in view of various situations. Therefore, when the speed limit and the target speed are different from each other, the driving support ECU 10 inquires of the driver whether or not the driver wishes to set the target speed to the speed limit. For this inquiry, the inquiry display screen is displayed on the display device 51.

Figure 3:
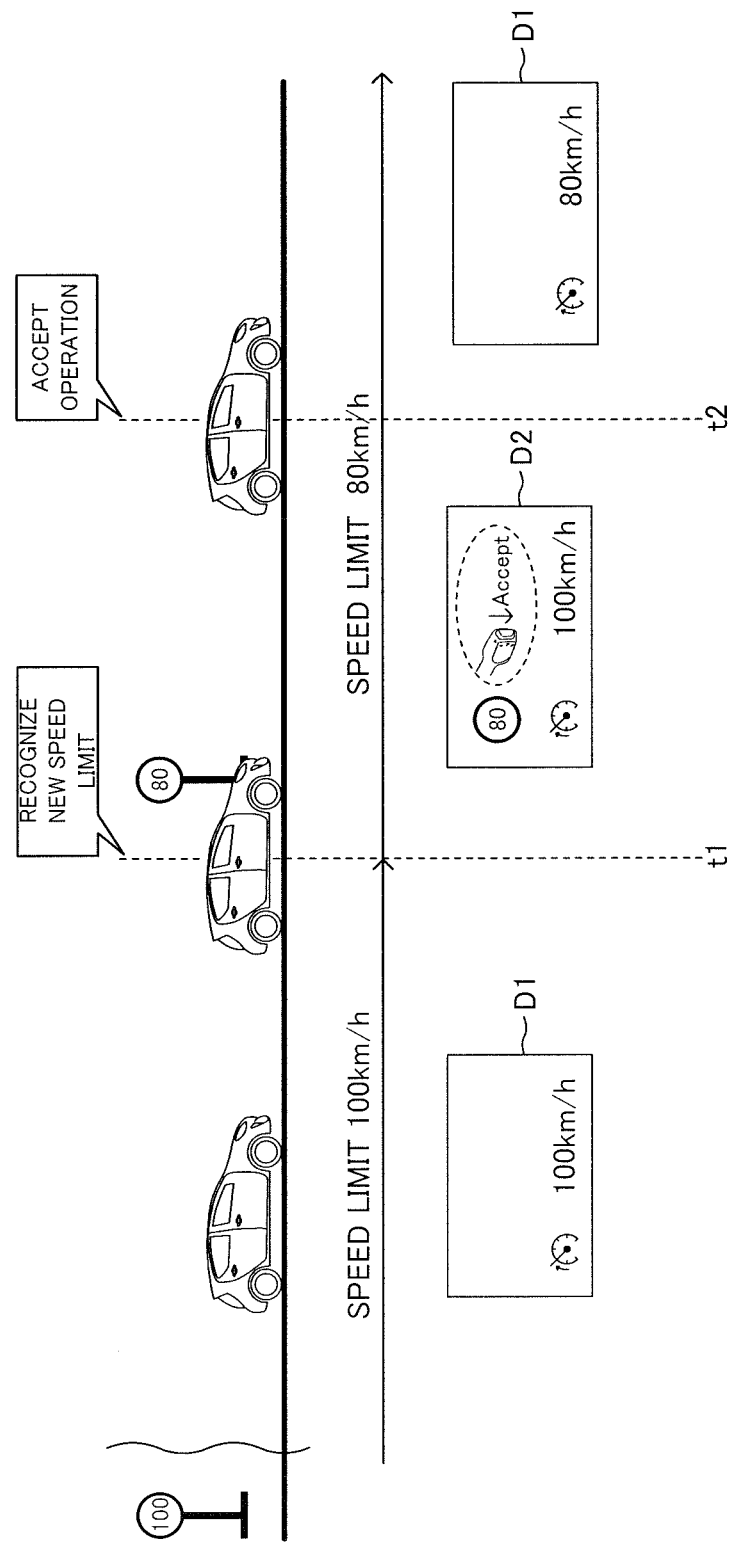
FIG. 3 is an explanatory drawing illustrating a switching of a display screen with a change in a speed limit.

For example, as illustrated in FIG. 3, when the vehicle travels at a target speed of 100 km/h on a road with a speed limit of 100 km/h, a normal display screen D1 is displayed on the display device 51. With this normal display screen D1, the driver can recognize that the target speed is 100 km/h. At the time t1 at which the speed limit acquisition ECU 20 detects (acquires) a new speed limit (80 km/h) from a road sign, the speed limit acquisition ECU 20 transmits information on the new speed limit to the driving support ECU 10. The driving support ECU 10 transmits the new speed limit, the current target speed, and the inquiry display command to the meter ECU 50, to have the meter ECU 50 display the inquiry display screen D2 on the display device 51.

The inquiry display screen D2 includes the target speed at the present time, the speed limit at the present time, and the mark (refer to a portion surrounded by a broken line: hereinafter referred to as an "accept direction mark") indicating the operation direction for the acceptance-response-operation. When the speed limit is higher than the target speed, the meter ECU 50 displays the accept direction mark indicating that the operation direction for the acceptance-response-operation to be conducted using the cruise operating unit 70 is upward. When the speed limit is lower than the target speed, the meter ECU 50 displays the accept direction mark indicating that operation direction for the acceptance-response-operation to be conducted using the cruise operating unit 70 is downward. In the example of FIG. 3, since the target speed at that time is 100 km/h whereas the speed limit is 80 km/h, the accept direction mark indicates that the push operation direction of the cruise operating unit 70 (operation direction for the acceptance-response-operation) is downward.

Figure 4:
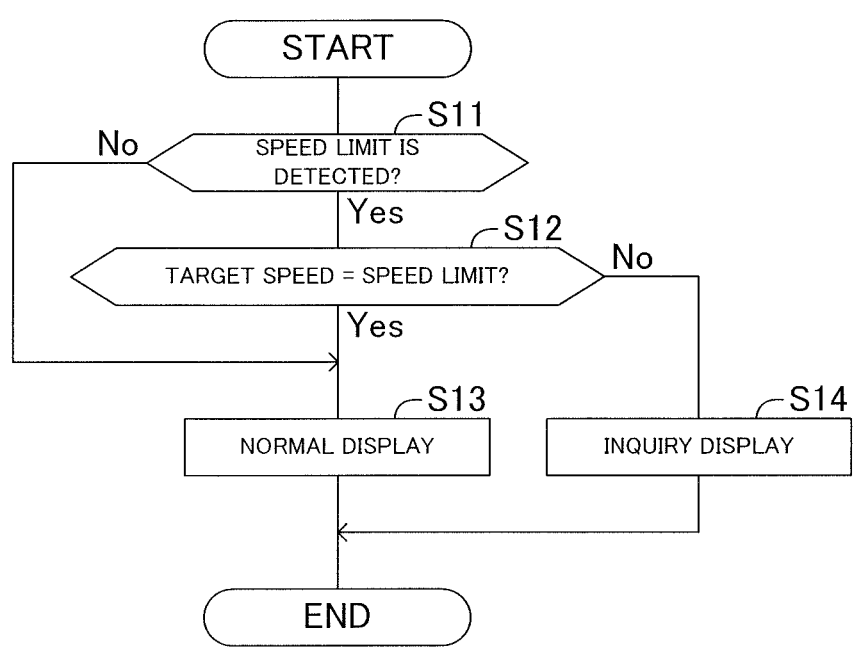
FIG. 4 is a flowchart illustrating a display control routine.

Next, a process for switching between the normal display screen D1 and the inquiry display screen D2 will be described. FIG. 4 illustrates a display control routine executed by the driving support ECU 10. When the mode for implementing the RSA-ACC (including the RSA-CC as described above) is selected, the driving support ECU 10 executes the display control routine every time a predetermined calculation cycle elapses.

When the display control routine is started, at step S11, the driving support ECU 10 determines whether or not the speed limit has been detected, that is, whether or not the speed limit acquisition ECU 20 has recognized the speed limit of the road on which the own vehicle is traveling. When the speed limit has been detected by the speed limit acquisition ECU 20 (S11: Yes), the driving support ECU 10 determines whether or not the current target speed and the current speed limit are equal to each other at step S12.

When the target speed and the speed limit are equal to each other (S12: Yes), the driving support ECU 10 transmits the information on the target speed and a normal display command to the meter ECU 50 at step S13. As a result, the meter ECU 50 has the display device 51 display the normal display screen D1 including the target speed.

On the other hand, when the target speed and the speed limit are different from each other (S12: No), the driving support ECU 10 transmits to the meter ECU 50 the information on the target speed and the speed limit, and the inquiry display command at step S14. As a result, the meter ECU 50 has the display device 51 display the inquiry display screen D2 including the target speed, the speed limit, and the accept direction mark. In this way, the driver is notified that the target speed is different from the speed limit (for suggesting setting the target speed to the speed limit).

When the speed limit has not been detected (S11: No), the driving support ECU 10 advances the process to step S13. Therefore, in this case, the normal display screen D1 is displayed on the display device 51.

After executing the process of step S13 or step S14, the driving support ECU 10 tentatively ends the display control routine, and thereafter repeats the display control routine every time the predetermined calculation cycle elapses. Therefore, when the speed limit is different from the target speed, the inquiry is conducted as to whether or not it is acceptable for the driver to set the target speed to the speed limit. Further, the target speed displayed on the display device 51 represents the target speed set in a target speed setting routine described later in real time.

While the inquiry display screen D2 is displayed on the display device 51 (that is, while the speed limit is different from the target speed), if the long-push operation of the cruise operating unit 70 is performed in the direction indicated by the accept direction mark, the driving support ECU 10 sets the target speed to the speed limit. For example, if it is detected that the upward long-push operation of the cruise operating unit 70 is performed while the speed limit is higher than the target speed, the driving support ECU 10 sets the target speed to the speed limit (whereas, if the direction of the long-push operation of the cruise operating unit 70 is the downward direction, the driving support ECU 10 does not set the target speed to the speed limit). On the other hand, if it is detected that the downward long-push operation of the cruise operating unit 70 is performed while the speed limit is lower than the target speed, the driving support ECU 10 sets the target speed to the speed limit (whereas, if the direction of the long-push operation of the cruise operating unit 70 is the upward direction, the driving support ECU 10 does not set the target speed to the speed limit).

The direction of the acceptance-response-operation for permitting the speed limit to be set as the target speed is set in the same direction as the direction of the operation of the cruise operating unit 70 for increasing or decreasing the target speed. For example, if the speed limit is higher than the target speed, the target speed is increased when the acceptance-response-operation for accepting to set the target speed to the speed limit is conducted. Therefore, the direction of the acceptance-response-operation in this case is the same direction as the direction of the operation using the cruise operating unit 70 for increasing the target speed. In contrast, if the speed limit is lower than the target speed, the target speed is decreased when the acceptance-response-operation for accepting to set the target speed to the speed limit is conducted. Therefore, the direction of the acceptance-response-operation in this case is the same direction as the direction of the operation using the cruise operating unit 70 for decreasing the target speed.

Further, in order to determine whether or not the specific responsive operation (acceptance-response-operation) has been performed according to the driver's intention, for the acceptance-response-operation to accept to set the target speed to the speed limit, the long-push operation of the cruise operating unit 70 is required. Therefore, even when the cruise operating unit 70 is pushed in the direction of the acceptance-response-operation while the inquiry display screen D2 is being displayed, the driving support ECU 10 does not accept the push operation as the acceptance-response-operation unless the push operation is the long-push operation.

In this manner, the function for the long-push operation using the cruise operating unit 70 is switched between the function which is effective when the normal display screen D1 is being displayed and the function which is effective when the inquiry display screen D2 is being displayed. That is, when the normal display screen D1 is being displayed, the long-push operation (in the upward direction or in the downward direction) of the cruise operating unit 70 functions as the acceleration operation or the coast operation. On the other hand, when the inquiry display screen D2 is being displayed, the long-push operation (in the upward direction or in the downward direction) of the cruise operating unit 70 functions as the acceptance-response-operation to set the target speed to the speed limit.

For example, as illustrated in FIG. 3, when the long-push operation of the cruise operating unit 70 in the direction of the acceptance-response-operation is detected at the time t2, the target speed is set to the speed limit and the inquiry display screen D2 is switched to the normal display screen D1. In this example, the target speed is switched from 100 km/h to 80 km/h.

Hereinafter, the acceptance response for accepting to set the target speed to the speed limit is called "accept", and the acceptance-response-operation is called an "accept operation".

Figure 5:
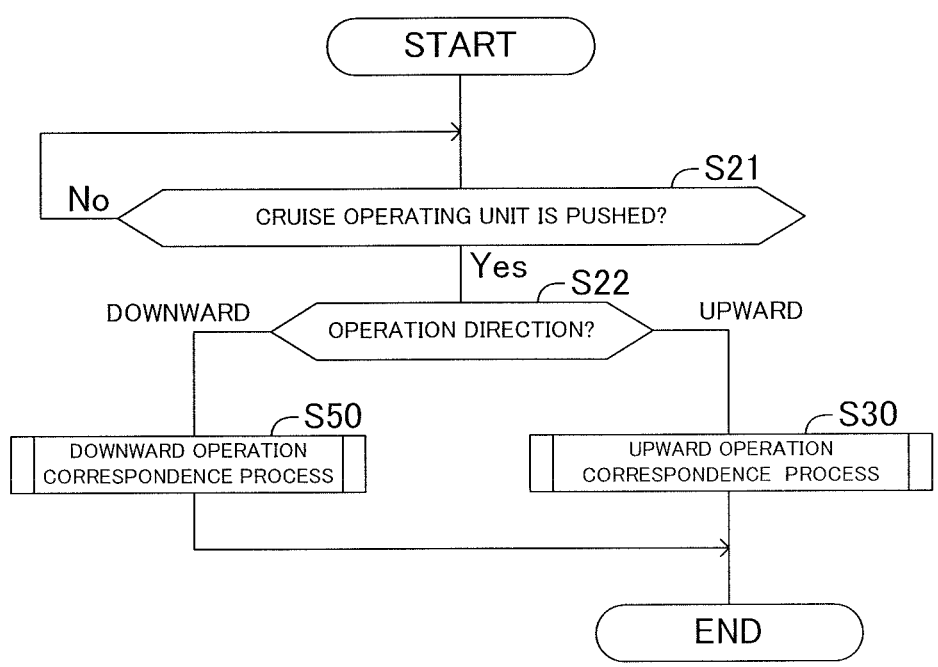
FIG. 5 is a flowchart illustrating a target speed setting routine.

As described above, the cruise operating unit 70 is used for conducting both the increase/decrease adjustment operation of the target speed in the constant speed control and the accept operation for setting the target speed to the speed limit. Therefore, it is necessary to avoid occurrence of a situation in which the setting of the target speed according to the operation of the cruise operating unit 70 is not along with the intention of the driver. For this reason, the driving support ECU 10 executes a target speed setting process described below. FIG. 5 illustrates the target speed setting routine executed by the driving support ECU 10. When the mode for executing the RSA-ACC is selected, the driving support ECU 10 executes the target speed setting routine every time a predetermined calculation cycle elapses, in parallel with the above-described display control routine.

When the target speed setting routine is started, the driving support ECU 10 determines whether or not the cruise operating unit 70 is being pushed at step S21. Here, the driving support ECU 10 determines whether or not either the operation in the upward direction (ON operation of the resume/speed-increasing switch 73) that is relating to the setting of the target speed or the operation in the downward operation (ON operation of the set/speed-reduction switch 74) that is relating to the setting of the target speed is being performed.

The driving support ECU 10 repeats the determination of step S21 every time the predetermined calculation cycle elapses, and waits until the push operation of the cruise operating unit 70 is detected. Upon detecting the push operation of the cruise operating unit 70 (S21: Yes), the driving support ECU 10 determines the direction of the push operation at step S22. In the case of the upward push operation (the resume/speed-increasing switch 73 is turned ON), the driving support ECU 10 executes an upward operation correspondence process at step S30. In the case of the downward push operation (the set/speed-reduction switch 74 is turned ON), the driving support ECU 10 executes a downward operation correspondence process at step S50.

Figure 6:
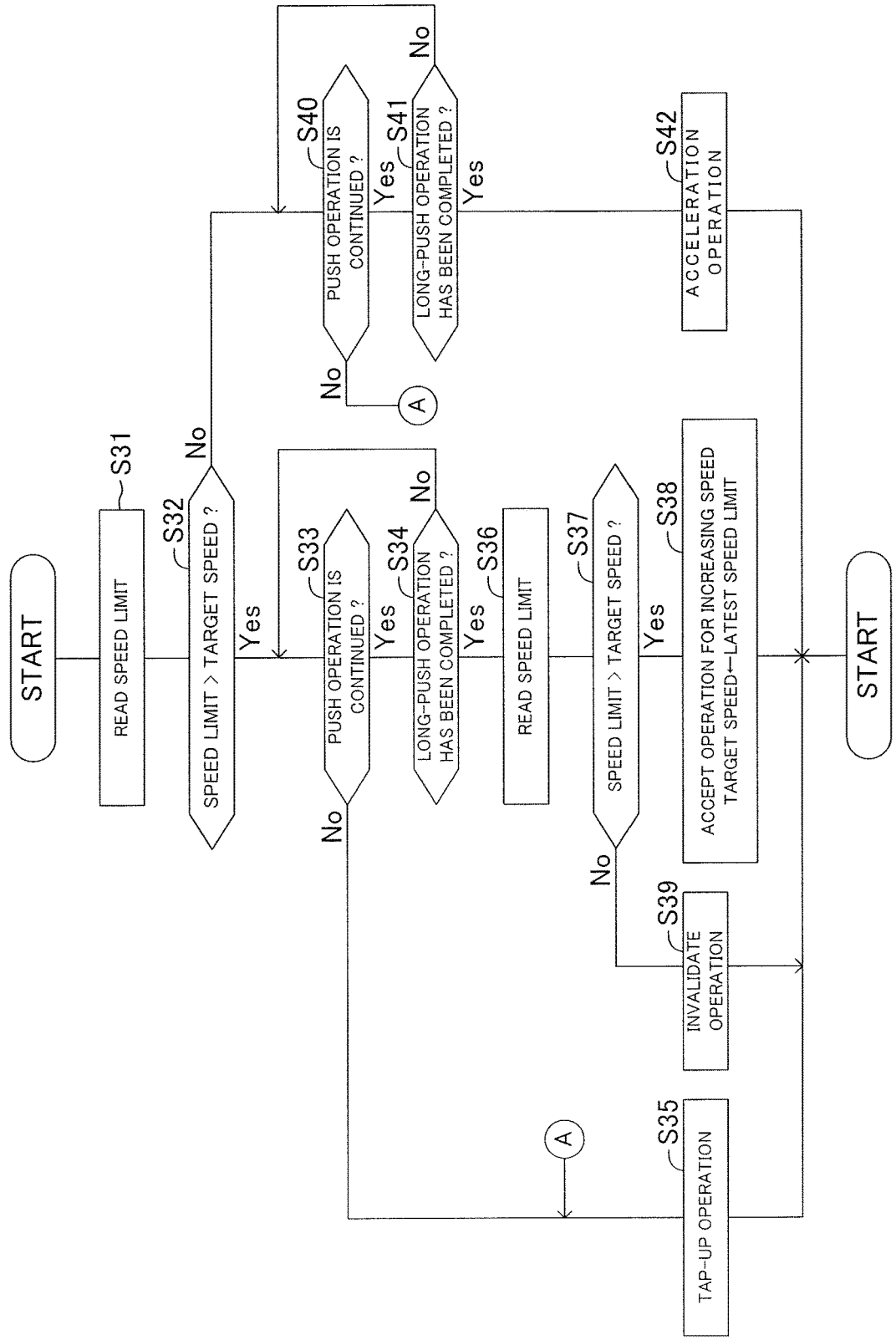
FIG. 6 is a flowchart illustrating a process routine executed in accordance with an operation in an upward direction (upward operation correspondence process).

The upward operation corresponding process (S30) is executed according to a routine illustrated in FIG. 6. The downward operation correspondence process (S50) is executed according to a routine illustrated in FIG. 7. First, the upward operation correspondence processing routine will be described. When the upward operation correspondence processing routine is started, the driving support ECU 10 reads, at step S31, the latest speed limit detected by the speed limit acquisition ECU 20. At step S32, the driving support ECU 10 determines whether or not the speed limit is higher than the current target speed. When the speed limit is higher than the target speed (S32: Yes), the driving support ECU 10 advances the process to step S33.

At step S33, the driving support ECU 10 determines whether or not the push operation of the cruise operating unit 70 is being continued. When the push operation of the cruise operating unit 70 is being continued, the driving support ECU 10 determines whether or not the long-push operation has been completed/confirmed at step S34. In other words, the driving support ECU 10 measures a duration time (the ON-duration time of the resume/speed-increasing switch 73) for which the cruise operating unit 70 is being pushed. Then, the driving support ECU 10 determines whether or not the ON-duration time is equal to or longer than a predetermined long-push completion time.

When the long-push operation of the cruise operating unit 70 has not been completed (S34: No), the driving support ECU 10 returns the process to step S33 and repeats the above-described process every time a predetermined calculation cycle elapses. If the push operation of the cruise operating unit 70 is terminated before the long-push operation is completed (S33: No), that is, if the operation of the cruise operating unit 70 is the short-push operation, the driving support ECU 10 regards/treats the operation as the tap-up operation to increase the target speed by a predetermined speed width/amount (for example, 1 km/h) at step S35.

On the other hand, at step S34, if the duration of time for which the push operation of the cruise operating unit 70 is being continued becomes equal to or longer than the long-push completion time, the driving support ECU 10 advances the process to step S36. At step S36, the driving support ECU 10 reads the latest speed limit detected by the speed limit acquisition ECU 20. Next, at step S37, the driving support ECU 10 determines whether or not the speed limit is higher than the current target speed. When the speed limit is higher than the target speed (S37: Yes), the driving support ECU 10 regards/treats the current long-push operation of the cruise operating unit 70 as the accept operation in the speed increasing direction at step S38, and sets the target speed to the latest speed limit (read at step S36).

For example, during the long-push operation of the cruise operating unit 70 (in a period in which the long-push completion time has not elapsed after the push operation of the cruise operating unit 70 was started), the speed limit recognized by the speed limit acquisition ECU 20 may change from a first speed limit to a second speed limit. In this case, when the second speed limit is higher than the current target speed, the driving support ECU 10 selects the second speed limit (the latest speed limit) instead of the first speed limit, and sets the target speed to the second speed limit (the second speed limit→the target speed).

On the other hand, when the speed limit read at step S36 is equal to or lower than the target speed (S37: No), that is, the speed limit when the push operation of the cruise operating unit 70 was started was higher than the target speed and the latest speed limit when the long-push operation has been completed is equal to or lower than the target speed, the driving support ECU 10 invalidates the operation of the cruise operating unit 70 at step S39. That is, the driving support ECU 10 does not change the target speed with respect to (regardless of) the operation of the cruise operating unit 70.

Further, at step S32, when the driving support ECU 10 decides that the speed limit is equal to or lower than the target speed (S32: No), that is, when the speed limit at the time of starting the operation of the cruise operating unit 70 is equal to or lower than the target speed, the driving support ECU 10 advances the process to step S40.

It should be noted that if the speed limit acquisition ECU 20 has not recognized the speed limit when the driving support ECU 10 reads the speed limit at step S31 or step S36, a "No" determination is made at step S32 or step S37.

At step S40, the driving support ECU 10 determines whether or not the push operation of the cruise operating unit 70 is being continued. When the push operation of the cruise operating unit 70 is being continued, the driving support ECU 10 determines whether or not the long-push operation has been completed/confirmed at step S41.

When the long-push operation of the cruise operating unit 70 has not been completed (S41: No), the driving support ECU 10 returns the process to step S40 to repeat the above-described process every time the predetermined calculation cycle elapses. If the push operation of the cruise operating unit 70 is terminated before the long-push operation is completed (S40: No), that is, if the operation of the cruise operating unit 70 is the short-push operation, the driving support ECU 10 advances the process to step S35. Then, at step S35, the driving support ECU 10 treats/regards the push operation as the tap-up operation to increase the target speed by the predetermined speed width/amount (for example, 1 km/h).

On the other hand, when the duration of time for which the push operation of the cruise operating unit 70 is being continued is equal to or longer than the long-push completion time at step S41, the driving support ECU 10 treats/regards the current long-push operation of the cruise operating unit 70 not as the accept operation but as the acceleration operation to gradually increase the target speed from the current value at step S42. In this case, the driving support ECU 10 increases the target speed every time the predetermined cycle elapses, in a period which starts from a time point at which the long-push operation has been completed and in which the push operation of the cruise operating unit 70 is being continued (in a period until the push operation of the cruise operating unit 70 is not detected). For example, the driving support ECU 10 gradually increases the target speed with a predetermined speed interval (such as 80 km/h→85 km/h→90 km/h→☐) each time a certain constant time elapses.

At each of steps S35, S38, S39, and S42, once the driving support ECU 10 performs the target speed setting process (including the invalidating process) corresponding to the operation of the cruise operating unit 70, it tentatively terminates the present routine. Thereafter, the driving support ECU 10 returns the process to step S21 (FIG. 5) and repeats the above-described process.

Next, the downward operation correspondence processing routine (FIG. 7) will be described. When the downward operation correspondence processing routine is started, the driving support ECU 10 reads the latest speed limit detected by the speed limit acquisition ECU 20, at step S51. At step S52, the driving support ECU 10 determines whether or not the speed limit is lower than the current target speed. When the speed limit is lower than the target speed (S52: Yes), the driving support ECU 10 advances the process to step S53.

At step S53, the driving support ECU 10 determines whether or not the push operation of the cruise operating unit 70 is being continued. When the push operation of the cruise operating unit 70 is being continued, the driving support ECU 10 determines whether or not the long-push operation has been completed/confirmed at step S54. In other words, the driving support ECU 10 measures the duration time (the ON-duration time of the set/speed-reduction switch 74) for which the cruise operating unit 70 is being pushed, and then, determines whether or not the ON-duration time is equal to or longer than the predetermined long-push completion time.

When the long-push operation of the cruise operating unit 70 has not been completed (S54: No), the driving support ECU 10 returns the process to step S53 to repeat the above-described process every time the predetermined calculation cycle elapses. If the push operation of the cruise operating unit 70 is terminated before the long-push operation has been completed (S53: No), that is, if the operation of the cruise operating unit 70 is the short-push operation, the driving support ECU 10 treats/regards the push operation as the tap-down operation to decrease the target speed by a predetermined speed width (for example, 1 km/h), at step S55.

On the other hand, at step S54, if the duration of time for which the push operation of the cruise operating unit 70 is continued is equal to or longer than the long-push completion time, the driving support ECU 10 advances the process to step S56. At step S56, the driving support ECU 10 reads the latest speed limit detected by the speed limit acquisition ECU 20. Then, at step S57, the driving support ECU 10 determines whether or not the speed limit is lower than the current target speed. When the speed limit is lower than the target speed (S57: Yes), at step S58, the driving support ECU 10 treats/regards the current long-push operation of the cruise operating unit 70 as the accept operation for the speed reduction direction to set the target speed to the latest speed limit (read at step S56).

For example, during the long-push operation of the cruise operating unit 70 (in a period in which the long-push completion time has not elapsed after the push operation of the cruise operating unit 70 was started), the speed limit recognized by the speed limit acquisition ECU 20 may change from a first speed limit to a second speed limit. In this case, when the second speed limit is lower than the current target speed, the driving support ECU 10 selects the second speed limit (the latest speed limit) instead of the first speed limit, and sets the target speed to the second speed limit (the second speed limit→the target speed).

On the other hand, when the speed limit read at step S56 is equal to or higher than the target speed (S57: No), that is, the speed limit when the push operation of the cruise operating unit 70 was started is lower than the target speed and the latest speed limit when the long-push operation has been completed is equal to or higher than the target speed, the driving support ECU 10 invalidates the operation of the cruise operating unit 70 at step S59. That is, the driving support ECU 10 does not change the target speed with respect to (regardless of) the operation of the cruise operating unit 70.

Further, at step S52, when the driving support ECU 10 decides that the speed limit is equal to or higher than the target speed (S52: No), that is, when the speed limit at the time of starting the operation of the cruise operating unit 70 is equal to or higher than the target speed, the driving support ECU 10 advances the process to step S60.

It should be noted that if the speed limit acquisition ECU 20 has not recognized the speed limit when the driving support ECU 10 reads the speed limit at step S51 or step S56, a "No" determination is made at step S52 or at step S57.

At step S60, the driving support ECU 10 determines whether or not the push operation of the cruise operating unit 70 is being continued. When the push operation of the cruise operating unit 70 is being continued, the driving support ECU 10 determines whether or not the long-push operation has been completed/confirmed at step S61.

When the long-push operation of the cruise operating unit 70 has not been completed (S61: No), the driving support ECU 10 returns the process to step S60 to repeat the above-described process every time the predetermined calculation cycle elapses. If the push operation of the cruise operating unit 70 is terminated before the long-push operation is completed (S61: No), that is, if the operation of the cruise operating unit 70 is the short-push operation, the driving support ECU 10 advances the process to step S55. Then, at step S55, the driving support ECU 10 treats/regards the push operation as the tap-down operation to decrease the target speed by the predetermined speed width/amount (for example, 1 km/h).

On the other hand, when the duration of time for which the push operation of the cruise operating unit 70 is being continued is equal to or longer than the long-push completion time at step S61, the driving support ECU 10 treats/regards the current long-push operation of the cruise operating unit 70 not as the accept operation but as the coast operation to gradually decrease the target speed from the current value at step S62. In this case, the driving support ECU 10 decreases the target speed every time the predetermined cycle elapses, in a period which starts from a time point at which the long-push operation has been completed and in which the push operation of the cruise operating unit 70 is being continued (in a period until the push operation of the cruise operating unit 70 is not detected). For example, the driving support ECU 10 gradually decreases the target speed at a predetermined speed interval (such as 100 km/h→95 km/h→90 km/h→☐) each time a certain period of time elapses.

At each of the steps S55, S58, S59, and S62, once the driving support ECU 10 performs the target speed setting process (including the invalidating process) corresponding to the operation of the cruise operating unit 70, it tentatively terminates the present routine. Thereafter, the driving support ECU 10 returns the process to step S21 (FIG. 5) and repeats the above-described process.

According to the target speed setting routine described above, when the cruise operating unit 70 is operated for the short-push operation, the target speed is increased or decreased by the predetermined speed width (for example, 1 km/h) regardless of the speed limit recognized by the speed limit acquisition ECU 20. In other words, when the cruise operating unit 70 is operated for the short-push operation in the upward direction, the driving support ECU 10 determines that the tap-up operation has been performed, and advances the process accordingly. In addition, when the cruise operating unit 70 is operated for the short-push operation in the downward direction, the driving support ECU 10 determines that the tap-down operation has been performed, and advances the process accordingly.

On the other hand, when the cruise operating unit 70 is operated for the long-push operation, the function of the cruise operating unit 70 is determined in accordance with the magnitude relationship between the current target speed and the speed limit recognized when the long-push operation was started, and the magnitude relationship between the current target speed and the speed limit recognized when the long-push operation has been completed/confirmed. Here, the target speed at the present time is referred to as a target speed Vset, the speed limit recognized when the long-push operation is started is referred to as a first speed limit Vlim1, and the speed limit recognized when the long-push operation has been completed is referred to as a second speed limit Vlim2. In addition, the expression "when the long-push operation is started" means a time point at which the push operation of the cruise operating unit 70 is started, and therefore, the long-push operation has not yet been determined to be completed at that time point.

For example, when the driver starts the long-push operation of the cruise operating unit 70 immediately before the own vehicle passes through a point at which the speed limit is switched, the speed limit recognized by the speed limit acquisition ECU 20 may change while the long-push operation is being performed (i.e., in a period from the time of starting the long-push operation until the long-push operation has been completed). In that case, the target speed may be set to a speed different from the speed which the driver wanted to set as the target speed when the driver started to operate the cruise operating unit 70, which causes the driver to feel discomfort. In view of the above, the driving support ECU 10 switches the function of the cruise operating unit 70 (the process of setting the target speed with respect to the operation of the cruise operating unit 70) on the basis of the above-mentioned magnitude relationships.

FIG. 8 is a diagram illustrating the function of the cruise operating unit 70 when the cruise operating unit 70 is operated upwardly for the long-push operation. The function changes based on the magnitude relationship between the target speed Vset and the first speed limit Vlim1 at the time point at which the long-push operation is started, and the magnitude relationship between the target speed Vset and the second speed limit Vlim2 at the time point at which the long-push operation has been completed/confirmed. FIG. 9 is a diagram illustrating the function of the cruise operating unit 70 when the cruise operating unit 70 is operated downwardly for the long-push operation. The function changes based on the magnitude relationship between the target speed Vset and the first speed limit Vlim1 at the time point at which the long-push operation is started, and the magnitude relationship between the target speed Vset and the second speed limit Vlim2 at the time point at which the long-push operation has been completed/confirmed. It should be noted that, since the target speed is not switched in the period before the long-push operation has been completed/confirmed, the target speed Vset at the time point at which the long-push operation is started and the target speed Vset at the time point at which the long-push operation has been completed/confirmed are the same (the current target speed).

First, the case where the cruise operating unit 70 is operated in the upward direction for the long-push operation will be described.

<First Function of Upward Direction>

In a case where the cruise operating unit 70 is operated upwardly for the long-push operation, if the first speed limit Vlim1 at the start of the operation is higher than the target speed Vset, it can be inferred that the driver operates the cruise operating unit 70 with the intention to increase the target speed to the speed limit. Therefore, the driving support ECU 10 basically treats the long-push operation of the cruise operating unit 70 as the accept operation. However, there is a case where the speed limit changes from the first speed limit Vlim1 to the second speed limit Vlim2 while the long-push operation being performed (before the long-push operation has been completed/confirmed).

In view of the above, when the speed limit has changed from the first speed limit Vlim1 to the second speed limit Vlim2 during the upward operation of the cruise operating unit 70 for the long-push operation, the driving support ECU 10 treats the operation of the cruise operating unit 70 as the accept operation for setting the target speed to the second speed limit Vlim2 (S38, and the lower right cell in FIG. 8).

For example, when the own vehicle is about to pass through a point at which the speed limit is switched, the driver may recognize a road sign, set up ahead of the vehicle, indicating the second speed limit Vlim2, earlier than the speed limit acquisition ECU 20 recognizes it. In this case, the driver expects that, by conducting the accept operation, the target speed is set to the speed limit recognized by himself/herself. In other words, the driver starts the long-push operation of the cruise operating unit 70 with (based on) the intention to set the target speed to the speed limit recognized by himself/herself.

When the speed limit recognized by the speed limit acquisition ECU 20 changes from the first speed limit Vlim1 to the second speed limit Vlim2 during the long-push operation of the cruise operating unit 70, the driving support ECU 10 sets the target speed to the second speed limit Vlim2 which is the latest speed limit. Therefore, it is possible to set the target speed along with (according to) the intention of the driver. Further, it is possible to reduce discomfort on the driver.

Also, there is a case where the driver has not yet recognized the second speed limit Vlim2 when the driver starts the long-push operation of the cruise operating unit 70. Even in that case, when both the first speed limit Vlim1 and the second speed limit Vlim2 are higher than the current target speed Vset, considering the driver's operation intention to increase the target speed to the speed limit (the first speed limit Vlim1), setting the target speed to the second speed limit Vlim2 which is the latest speed limit is convenient for the driver. Therefore, also in this case, it is possible to reduce discomfort on the driver. In addition, high degree of convenience can be achieved.

Figure 10A:
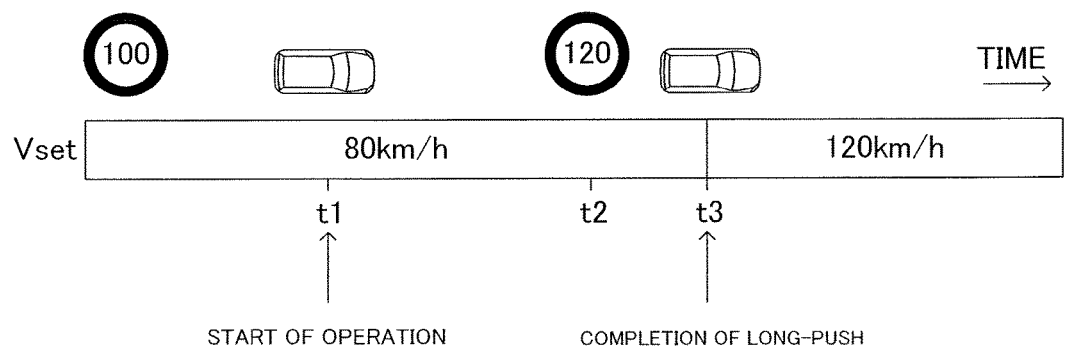
FIG. 10A is an explanatory drawing illustrating a first function of an upward direction according to the present embodiment.

For example, as illustrated in FIG. 10A, when the target speed Vset is 80 km/h and the speed limit (first speed limit Vlim1) recognized by the speed limit acquisition ECU 20 is 100 km/h (hereinafter, referred to as "initial situation 1"), a case is considered where the driver starts the upward push operation of the cruise operating unit 70 at a time t1. In this case, the speed limit acquisition ECU 20 recognizes a new speed limit (the second speed limit Vlim2=120 km/h) at a time t2 before a time t3 at which the long-push operation is completed/confirmed. Thus, the target speed is set to the second speed limit Vlim2 at the time t3. That is, the target speed is set under the assumption that the "accept operation for setting the target speed to the latest second speed limit Vlim2" has been conducted.

Hereinafter, the above-described function of the driving support ECU 10 is referred to as a "first function of the upward direction". In this function, when the recognized speed limit is changed from the first speed limit Vlim1 to the second speed limit Vlim2 during the long-push operation of the cruise operating unit 70 in the upward direction, the driving support ECU 10 treats the long-push operation as the accept operation for setting the target speed to the second speed limit Vlim2.

<Second Function of Upward Direction>

In the above example, both the first speed limit Vlim1 and the second speed limit Vlim2 are higher than the current target speed Vset. However, there is a case where the second speed limit Vlim2 is equal to or lower than the target speed Vset. In this case, if the upward long-push operation of the cruise operating unit 70 is treated as the accept operation for setting the target speed to the second speed limit Vlim2 as described above, the target speed is set to a speed which is not along with the driver's intention, whereby the driver may feel discomfort.

Therefore, when the second speed limit Vlim2 is equal to or lower than the target speed Vset, the long-push operation of the cruise operating unit 70 in the upward direction is invalidated (S39, and the lower center cell in FIG. 8). That is, setting the second speed limit Vlim2 as the target speed is prohibited.

Figure 11A:
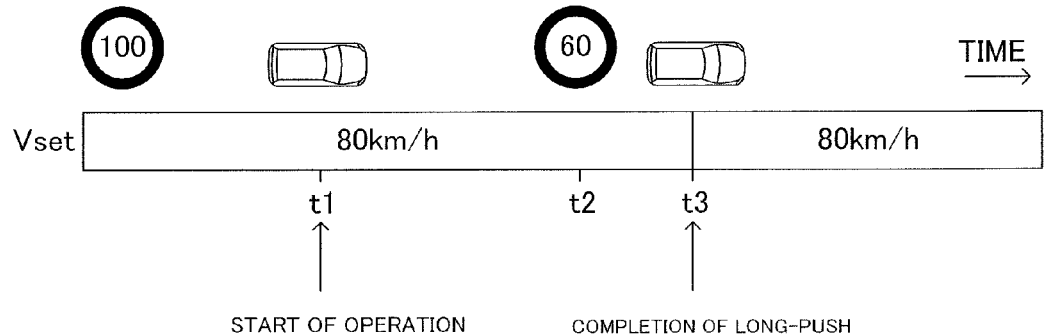
FIG. 11A is an explanatory drawing illustrating a second function of an upward direction according to the present embodiment.

For example, as illustrated in FIG. 11A, in the initial situation 1 similar to the above, when the speed limit recognized by the speed limit acquisition ECU 20 is switched to the second speed limit Vlim2 (=60 km/h) lower than the target speed Vset (=80 km/h) at the time t2 before the time t3 at which the long-push operation is completed/confirmed, the upward long-push operation of the cruise operating unit 70 is invalidated at the time t3. Therefore, the target speed is not changed, and the target speed Vset (=80 km/h) up to that time point is maintained. This makes it possible to reduce discomfort on the driver.

Further, in a period before the long-push operation has been completed/confirmed after the push operation of the cruise operating unit 70 was started, the speed limit acquisition ECU 20 may fail to recognize the speed limit. For example, when the own vehicle turns right or left at an intersection, there is a possibility that the speed limit is changed. In addition, if the travel distance of the own vehicle after previously detecting a speed limit sign (the travel distance of the own vehicle without detecting the next speed limit sign) exceeds a predetermined reliability determination distance, there is a possibility that the speed limit is changed. Further, when an abnormality of the in-vehicle camera 21 or the navigation apparatus 22 is detected, it becomes impossible to properly detect the speed limit. In the above situations, the reliability of the speed limit recognized by the speed limit acquisition ECU 20 is low.

Therefore, every time the predetermined calculation cycle elapses, the speed limit acquisition ECU 20 determines whether a degree of reliability of the recognized speed limit is lower than a reference level. When it is determined that the degree of reliability of the recognized speed limit is lower than the reference level, the speed limit acquisition ECU 20 transmits to the driving support ECU 10 information indicating that the speed limit has failed to be recognized.

For example, the speed limit acquisition ECU 20 determines whether or not the own vehicle has turned right or left at an intersection based on an image captured by the in-vehicle camera 21 or based on a traveling locus of the own vehicle detected by the navigation apparatus 22. When it is determined that the own vehicle has turned right or left at the intersection, the speed limit acquisition ECU 20 determines that the degree of reliability of the recognized speed limit becomes lower than the reference level. Further, the speed limit acquisition ECU 20 calculates the travel distance of the own vehicle without succeeding in detecting a speed limit sign, based on the vehicle speed detected by the vehicle speed sensor 80 and the duration time for which the speed limit sign has not been detected. When that travel distance exceeds the reliability determination distance, the speed limit acquisition ECU 20 determines that the degree of reliability of the recognized speed limit becomes lower than the reference level. In addition, when an abnormality of the in-vehicle camera 21 (or of the navigation apparatus 22) is detected, the speed limit acquisition ECU 20 determines that the degree of reliability of the recognized speed limit becomes lower than the reference level.

After the upward push operation of the cruise operating unit 70 was started, when the degree of reliability of the speed limit becomes lower than the reference level before the long-push operation has been completed/confirmed, the driving support ECU 10 invalidates the upward long-push operation of the cruise operating unit 70 (S39, and the lower left cell in FIG. 8). Therefore, the target speed is not changed. Hereinafter, a state in which the degree of reliability of the speed limit is lower than the reference level is referred to as an "unrecognized state" of the speed limit.

Figure 12A:
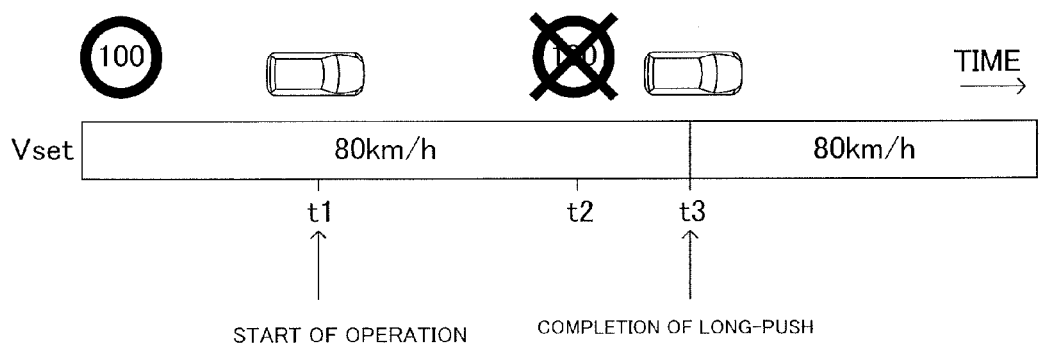
FIG. 12A is an explanatory drawing illustrating the second function of the upward direction according to the present embodiment.

For example, as illustrated in FIG. 12A, in the initial situation 1 similar to the above, when the unrecognized state of the speed limit occurs at the time t2 before the time t3 at which the upward long-push operation is completed/confirmed, the long-push operation of the cruise operating unit 70 is invalidated at the time t3. Accordingly, the target speed Vset (=80 km/h) up to that time is maintained. This prevents the target speed from being set to the speed limit having a low degree of reliability. Further, it is possible to reduce the inconvenience that the target speed is set to an erroneous speed limit to thereby cause discomfort on the driver.

Hereinafter, the following functions (i) and (ii) of the driving support ECU 10 are referred to as a "second function of the upward direction":

(i) The function of invalidating the long-push operation, when the recognized speed limit is switched from the first speed limit Vlim1 higher than the target speed Vset to the second speed limit Vlim2 lower than the target speed Vset during the upward long-push operation of the cruise operating unit 70 (FIG. 11A).

(ii) The function of invalidating the long-push operation, when the "state in which the first speed limit Vlim1 higher than the target speed Vset has been recognized" is switched to the "unrecognized state" during the upward long-push operation of the cruise operating unit 70 (FIG. 12A).

<Third Function of Upward Direction>

On the other hand, when the cruise operating unit 70 is operated upwardly for the long-push operation, in a case where the first speed limit Vlim1 at the time of starting the operation is equal to or lower than the target speed Vset, it can be inferred that the driver operates the cruise operating unit 70 with (according to) the intention to increase the target speed rather than the intention to set the target speed to the speed limit. In view of the above, if the first speed limit Vlim1 at the time of starting the operation is equal to or lower than the target speed Vset, the driving support ECU 10 treats/regards the operation of the cruise operating unit 70 as the acceleration operation when the upward long-push operation of the cruise operating unit 70 is detected.

In this case, a situation may arise in which the speed limit changes from the first speed limit Vlim1 to the second speed limit Vlim2 which is higher than the target speed Vset during the long-push operation (before the long-push operation has been completed/confirmed). However, even in that case (Vlim2>Vset), the intention of the driver when the driver started the operation of the cruise operating unit 70 should be reflected. Therefore, even if the speed limit is switched from the first speed limit Vlim1 (≤Vset) to the second speed limit Vlim2 (>Vset) during the long-push operation of the cruise operating unit 70 in the upward direction, the driving support ECU 10 treats/regards the operation of the cruise operating unit 70 as the acceleration operation (S42, and the middle cell in FIG. 8). Therefore, setting the target speed to the second speed limit Vlim2 is prohibited.

Figure 13:
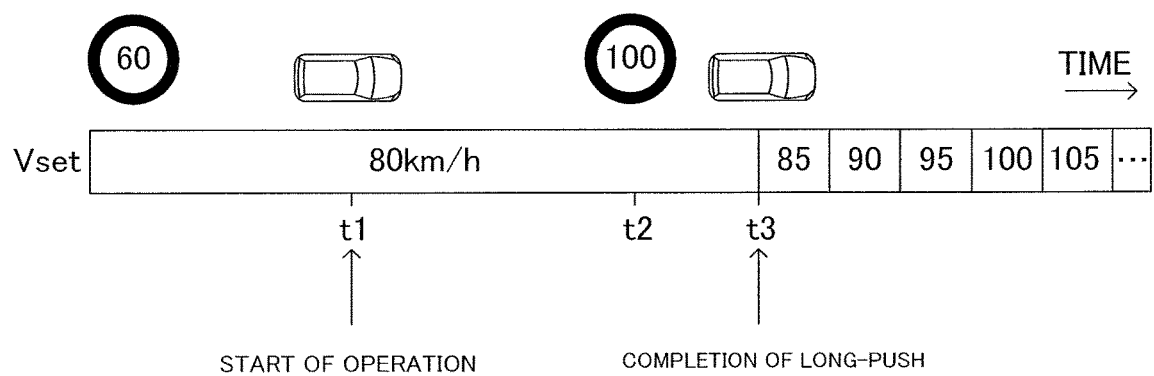
FIG. 13 is an explanatory drawing illustrating a third function of the upward direction.

For example, as illustrated in FIG. 13, when the target speed Vset is 80 km/h and the speed limit (first speed limit Vlim1) recognized by the speed limit acquisition ECU 20 is 60 km/h (hereinafter, referred to as "initial situation 2"), a case is considered where the driver starts the upward push operation of the cruise operating unit 70 at the time t1. In this case, the speed limit acquisition ECU 20 recognizes a new speed limit (the second speed limit Vlim2=100 km/h) at the time t2 before the time t3 at which the long-push operation is completed/confirmed. Even in this case, the target speed is not influenced by the second limit speed Vlim2. The driving support ECU 10 gradually increases the target speed at a predetermined speed interval (such as 85 km/h→90 km/h→95 km/h→100 km/h ☐) from the time t3. Therefore, it is possible to set the target speed reflecting the intention of the driver, and to reduce discomfort on the driver. In addition, since the driver can determine a desired target speed during the long-push operation, the convenience is improved.

Further, when the speed limit has not been recognized yet, a situation where the speed limit is recognized in the middle of the upward long-push operation of the cruise operating unit 70 (before the long-push operation has been completed/confirmed after the start of the push operation) should also be considered. When the second speed limit Vlim2 recognized after the long-push operation was started is higher than the target speed Vset, the driving support ECU 10 may be able to treat the upward long-push operation of the cruise operating unit 70 as the accept operation for setting the target speed to the second speed limit Vlim2. However, in this case, the process may be performed in a manner different from the intention of the driver when the driver started the operation of the cruise operating unit 70.

Therefore, when the upward long-push operation of the cruise operating unit 70 is detected to be started in a situation where the speed limit has not been recognized, even if a new speed limit (the second speed limit Vlim2 (>Vset)) is recognized in the middle of the upward long-push operation of the cruise operating unit 70, the driving support ECU 10 treats/regards the operation of the cruise operating unit 70 as the acceleration operation (S42, and the upper cell in FIG. 8).

Figure 14:
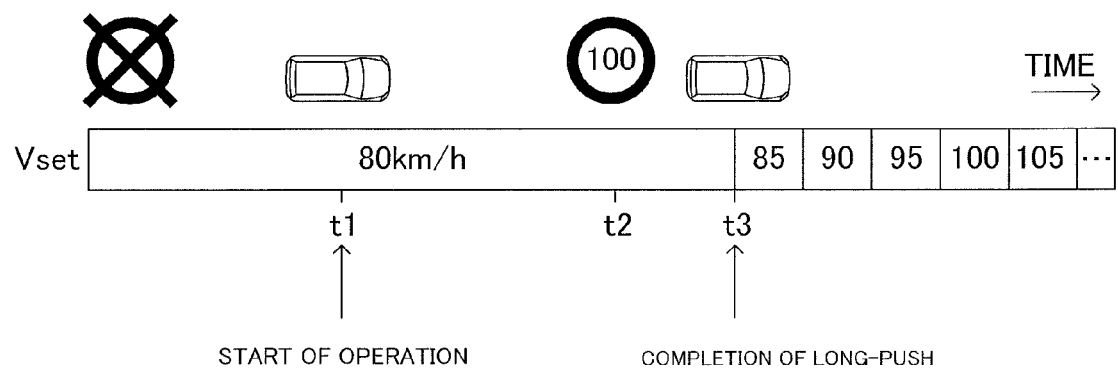
FIG. 14 is an explanatory drawing illustrating the third function of the upward direction.

For example, as illustrated in FIG. 14, when the target speed Vset is 80 km/h and the speed limit is in the unrecognized state (hereinafter, referred to as "initial situation 3"), a case is considered where the driver starts the upward push operation of the cruise operating unit 70 at the time t1. In this case, the speed limit acquisition ECU 20 recognizes a new speed limit (the second speed limit Vlim2=100 km/h) at the time t2 before the time t3 at which the long-push operation is completed/confirmed. Even in this case, the target speed is not influenced by the second limit speed Vlim2. The driving support ECU 10 gradually increases the target speed at a predetermined speed interval (such as 85 km/h→90 km/h→95 km/h→100 km/h ☐) from the time t3. Therefore, it is possible to set the target speed reflecting the intention of the driver, and to reduce discomfort on the driver. In addition, since the driver can determine a desired target speed during the long-push operation, the convenience is improved.

Hereinafter, the following functions (i) and (ii) of the driving support ECU 10 are referred to as a "third function of the upward direction":

(i) The function of treating/regarding the operation of the cruise operating unit 70 as the acceleration operation without being affected by the second speed limit Vlim2, when the speed limit (first speed limit Vlim1) at the time of starting the upward long-push operation of the cruise operating unit 70 is equal to or lower than the target speed Vset (FIG. 13), even if any value of the speed limit (the second speed limit Vlim2) is recognized in the middle of the long-push operation.

(ii) The function of treating/regarding the operation of the cruise operating unit 70 as the acceleration operation without being affected by the second speed limit Vlim2, when the speed limit has not been recognized yet at the time of starting the upward long-push operation of the cruise operating unit 70 (FIG. 14), even if any value of the speed limit (the second speed limit Vlim2) is recognized in the middle of the long-push operation.

Next, the case where the cruise operating unit 70 is operated for the long-push operation in a downward direction will be described.

<First Function of Downward Direction>

In a case where the cruise operating unit 70 is operated downwardly for the long-push operation, if the first speed limit Vlim1 at the start of the operation is lower than the target speed Vset, it can be inferred that the driver operates the cruise operating unit 70 with (according to) the intention to decrease the target speed to the speed limit. Therefore, the driving support ECU 10 basically treats the long-push operation of the cruise operating unit 70 as the accept operation. However, there is a case that the speed limit is changed from the first speed limit Vlim1 to the second speed limit Vlim2 while the long-push operation is being performed (before the long-push operation has been completed/confirmed).

Therefore, when the speed limit is changed from the first speed limit Vlim1 to the second speed limit Vlim2 during the long-push operation in the downward direction, the driving support ECU 10 treats the operation of the cruise operating unit 70 as the accept operation for setting the target speed to the second speed limit Vlim2 (the latest speed limit) (S58, and the lower right cell in FIG. 9).

For example, when the own vehicle is about to pass through a point at which the speed limit is switched, the driver may recognize a road sign, set up ahead of the vehicle, indicating the second speed limit Vlim2 earlier than the speed limit acquisition ECU 20 recognize it. In this case, the driver expects that, by conducting the accept operation, the target speed will be set to the speed limit recognized by himself/herself. In other words, the driver starts the long-push operation of the cruise operating unit 70 with (based on) the intention to set the target speed to the speed limit recognized by himself/herself.

In view of the above, when the speed limit recognized by the speed limit acquisition ECU 20 changes from the first speed limit Vlim1 to the second speed limit Vlim2 during the long-push operation of the cruise operating unit 70, the driving support ECU 10 sets the target speed to the second speed limit Vlim2 which is the latest speed limit. Therefore, it is possible to set the target speed along with the intention of the driver. Further, it is possible to reduce discomfort on the driver.

Also, there is a case where the driver has not yet recognized the second speed limit Vlim2 when the driver starts the long-push operation of the cruise operating unit 70. Even in that case, when both the first speed limit Vlim1 and the second speed limit Vlim2 are lower than the current target speed Vset, considering the driver's operation intention to decrease the target speed to the speed limit (the first speed limit Vlim1), setting the target speed to the second speed limit Vlim2 which is the latest speed limit is convenient for the driver. Therefore, also in this case, it is possible to reduce discomfort on the driver. In addition, high degree of convenience can be achieved.

Figure 15A:
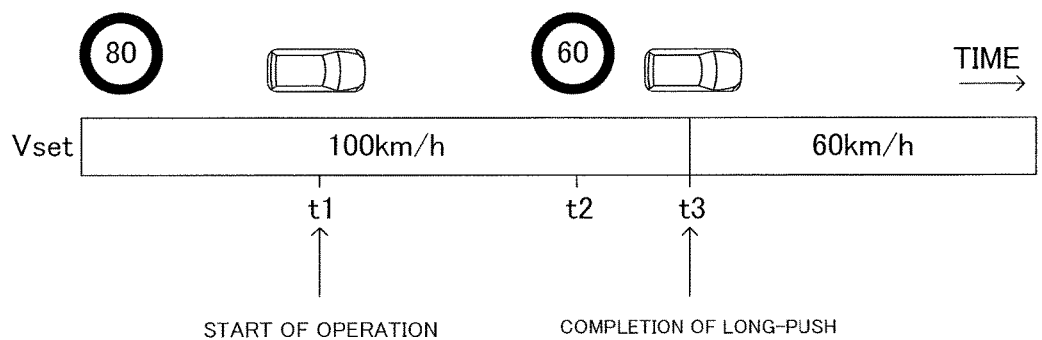
FIG. 15A is an explanatory drawing illustrating a first function of a downward direction according to the present embodiment.

For example, as illustrated in FIG. 15A, when the target speed Vset is 100 km/h and the speed limit (first speed limit Vlim1) recognized by the speed limit acquisition ECU 20 is 80 km/h (hereinafter, referred to as "initial situation 1'"), a case is considered where the driver starts the downward push operation of the cruise operating unit 70 at the time t1. In this case, the speed limit acquisition ECU 20 recognizes a new speed limit (the second speed limit Vlim2=60 km/h) at the time t2 before the time t3 at which the long-push operation is completed/confirmed. Thus, in this case, the target speed is set to the second speed limit Vlim2 at the time t3. That is, the target speed is set under the assumption that the accept operation for setting the target speed to the latest second speed limit Vlim2 has been conducted.

Hereinafter, the following function (i) of the driving support ECU 10 is referred to as a "first function of the downward direction:

(i) The function of treating the long-push operation as the accept operation for setting the target speed to the second speed limit Vlim2, when the recognized speed limit changes from the first speed limit Vlim1 to the second speed limit Vlim2 during the long-push operation of the cruise operating unit 70 in the downward direction.

<Second Function of Downward Direction>

In the above example, both the first speed limit Vlim1 and the second speed limit Vlim2 are lower than the current target speed Vset. However, there is a case where the second speed limit Vlim2 is equal to or higher than the target speed Vset. In this case, if the downward long-push operation of the cruise operating unit 70 is treated as the accept operation for setting the target speed to the second speed limit Vlim2 as described above, the target speed is set to a speed which is not along with the driver's intention, whereby the driver may feel discomfort.

Therefore, when the second speed limit Vlim2 is equal to or higher than the target speed Vset, the long-push operation of the cruise operating unit 70 in the downward direction is invalidated (S59, and the lower center cell in FIG. 9). That is, setting the second speed limit Vlim2 as the target speed is prohibited.

Figure 16A:
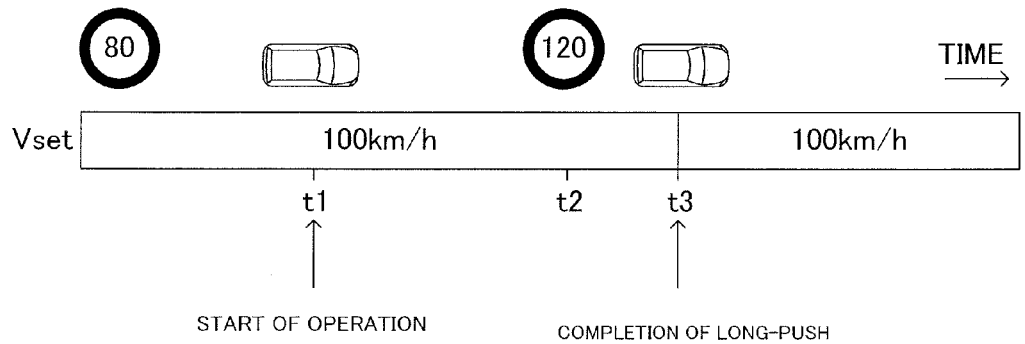
FIG. 16A is an explanatory drawing illustrating a second function of the downward direction according to the present embodiment.

For example, as illustrated in FIG. 16A, in the initial situation 1' similar to the above, when the speed limit recognized by the speed limit acquisition ECU 20 is switched to the second speed limit Vlim2 (=120 km/h) higher than the target speed Vset (=100 km/h) at the time t2 before the time t3 at which the long-push operation is completed/confirmed, the downward long-push operation of the cruise operating unit 70 is invalidated at the time t3. Therefore, the target speed is not changed, and the target speed Vset (=100 km/h) up to that time point is maintained. This makes it possible to reduce discomfort on the driver.

Further, in a period before the long-push operation has been completed/confirmed after the push operation of the cruise operating unit 70 was started, the speed limit acquisition ECU 20 may fail to recognize the speed limit. That is, the degree of reliability of the speed limit recognized by the speed limit acquisition ECU 20 may become lower than the reference level during the long-push operation of the cruise operating unit 70.

When the degree of reliability of the speed limit becomes lower than the reference level in a period before the long-push operation has been completed/confirmed after the downward push operation of the cruise operating unit 70 was started, the driving support ECU 10 invalidates the downward long-push operation of the cruise operating unit 70 (S59, and the lower left cell in FIG. 9). Therefore, the target speed is not changed.

Figure 17A:
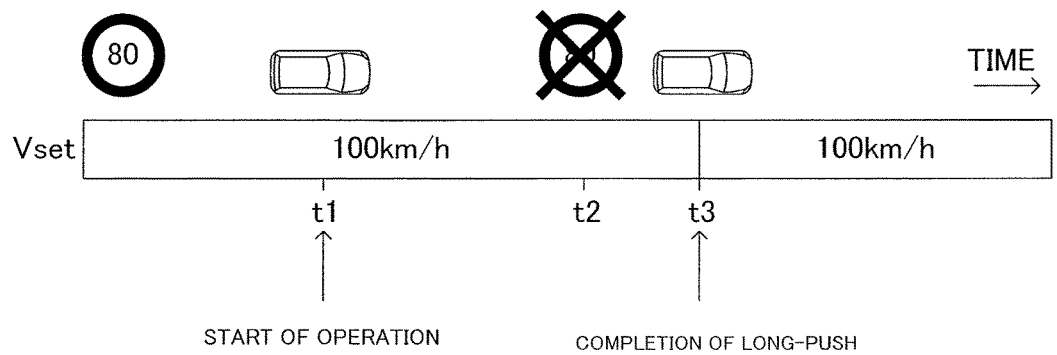
FIG. 17A is an explanatory drawing illustrating the second function of the downward direction according to the present embodiment.

For example, as illustrated in FIG. 17A, in the initial situation 1' similar to the above, when the unrecognized state of the speed limit occurs at the time t2 before the time t3 at which the upward long-push operation is completed/confirmed, the long-push operation of the cruise operating unit 70 is invalidated at the time t3. Accordingly, the target speed Vset (=100 km/h) up to that time is maintained. This prevents the target speed from being set to the speed limit having a low degree of reliability. Further, it is possible to reduce the inconvenience that the target speed is set to an erroneous speed limit to thereby cause discomfort on the driver.

Hereinafter, the following functions (i) and (ii) of the driving support ECU 10 are referred to as a "second function of the downward direction."

(i) The function of invalidating the long-push operation, when the recognized speed limit is switched from the first speed limit Vlim1 lower than the target speed Vset to the second speed limit Vlim2 higher than the target speed Vset during the downward long-push operation of the cruise operating unit 70 (FIG. 16A).

(ii) The function of invalidating the long-push operation, when the "state in which the first speed limit Vlim1 lower than the target speed Vset has been recognized" is switched to the "unrecognized state" during the downward long-push operation of the cruise operating unit 70 (FIG. 17A).

<Third Function of Downward Direction>

On the other hand, when the cruise operating unit 70 is operated downwardly for the long-push operation, in a case where the first speed limit Vlim1 at the time of starting the operation is equal to or higher than the target speed Vset, it can be inferred that the driver operates the cruise operating unit 70 with (according to) the intention to decrease the target speed rather than the intention to set the target speed to the speed limit. In view of the above, if the first speed limit Vlim1 at the time of starting the operation is equal to or higher than the target speed Vset, the driving support ECU 10 treats/regards the operation of the cruise operating unit 70 as the coast operation when the downward long-push operation of the cruise operating unit 70 is detected.

In this case, a situation may arise in which the speed limit changes from the first speed limit Vlim1 to the second speed limit Vlim2 which is lower than the target speed Vset during the long-push operation (before the long-push operation has been completed/confirmed). However, even in that case (Vlim2<Vset), the intention when the driver started the operation of the cruise operating unit 70 should be reflected. Therefore, even if the speed limit is switched from the first speed limit Vlim1 (≥Vset) to the second speed limit Vlim2 (<Vset) during the long-push operation of the cruise operating unit 70 in the downward direction, the driving support ECU 10 treats/regards the operation of the cruise operating unit 70 as the coast operation (S62, and the middle cell in FIG. 9). Therefore, setting the second speed limit Vlim2 as the target speed is prohibited.

Figure 18:
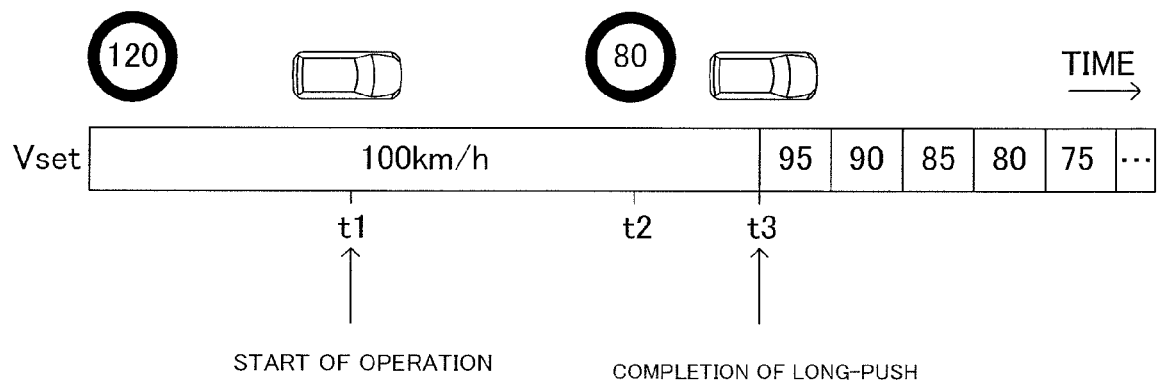
FIG. 18 is an explanatory drawing illustrating a third function of the downward direction.

For example, as illustrated in FIG. 18, when the target speed Vset is 100 km/h and the speed limit (first speed limit Vlim1) recognized by the speed limit acquisition ECU 20 is 120 km/h (hereinafter, referred to as "initial situation 2'"), a case is considered where the driver starts the downward push operation of the cruise operating unit 70 at the time t1. In this case, the speed limit acquisition ECU 20 recognizes a new speed limit (the second speed limit Vlim2=80 km/h) at the time t2 before the time t3 at which the long-push operation is completed/confirmed. Even in this case, the target speed is not influenced by the second limit speed Vlim2. The driving support ECU 10 gradually decreases the target speed at a predetermined speed interval (such as 95 km/h→90 km/h→85 km/h→80 km/h □) from the time t3. Therefore, it is possible to set the target speed reflecting the intention of the driver, and to reduce discomfort on the driver. In addition, since the driver can determine a desired target speed during the long-push operation, the convenience is improved.

Further, when the speed limit has not been recognized yet, a situation where the speed limit is recognized in the middle of the downward long-push operation of the cruise operating unit 70 (before the long-push operation has been completed/confirmed after the start of the push operation) should also be considered. When the second speed limit Vlim2 recognized after the long-push operation was started is lower than the target speed Vset, the driving support ECU 10 may be able to treat the downward long-push operation of the cruise operating unit 70 as the accept operation for setting the target speed to the second speed limit Vlim2. However, in this case, the process may be performed in a manner different from the intention of the driver when the driver started the operation of the cruise operating unit 70.

Therefore, when the long-push operation of the cruise operating unit 70 in the downward direction is detected to be started in a situation where the speed limit has not been recognized yet, even if a new speed limit (the second speed limit Vlim2 (<Vset)) is recognized in the middle of the downward long-push operation of the cruise operating unit 70, the driving support ECU 10 treats/regards the operation of the cruise operating unit 70 as the coast operation (S62, and the upper cell in FIG. 9).

Figure 19:
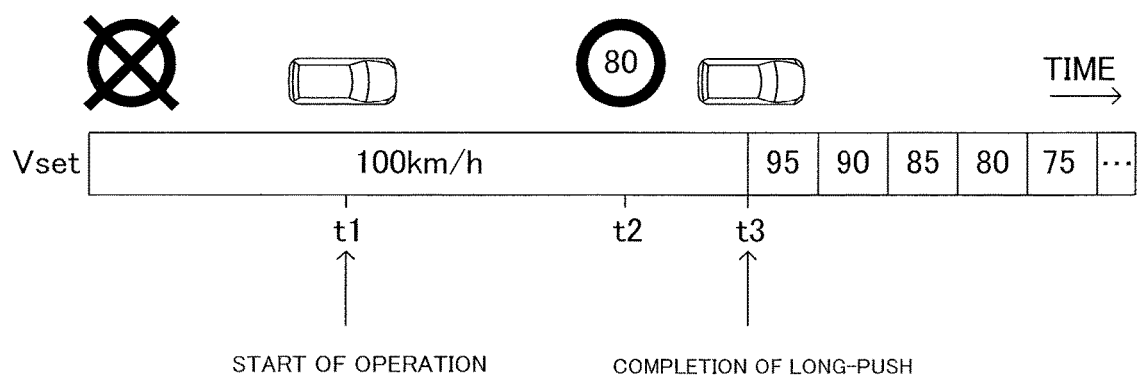
FIG. 19 is an explanatory drawing illustrating a third function of the downward direction.

For example, as illustrated in FIG. 19, when the target speed Vset is 100 km/h and the speed limit is in the unrecognized state (hereinafter, referred to as "initial situation 3'"), a case is considered where the driver starts the downward push operation of the cruise operating unit 70 at the time t1. In this case, the speed limit acquisition ECU 20 recognizes a new speed limit (the second speed limit Vlim2=80 km/h) at the time t2 before the time t3 at which the long-push operation is completed/confirmed. Even in this case, the target speed is not influenced by the second limit speed Vlim2. The driving support ECU 10 gradually decreases the target speed at a predetermined speed interval (such as 95 km/h→90 km/h→85 km/h→80 km/h □) from the time t3. Therefore, it is possible to set the target speed reflecting the intention of the driver, and to reduce discomfort on the driver. In addition, since the driver can determine a desired target speed during the long-push operation, the convenience is improved.

Hereinafter, the following functions (i) and (ii) of the driving support ECU 10 are referred to as a "third function of the downward direction."

(i) The function of treating/regarding the operation of the cruise operating unit 70 as the coast operation without being affected by the second speed limit Vlim2, when the speed limit (first speed limit Vlim1) at the time of starting the downward long-push operation of the cruise operating unit 70 is equal to or higher than the target speed Vset (FIG. 18), even if any value of the speed limit (the second speed limit Vlim2) is recognized in the middle of the long-push operation.

(ii) The function of treating/regarding the operation of the cruise operating unit 70 as the coast operation without being affected by the second speed limit Vlim2, when the speed limit has not been recognized yet at the time of starting the downward long-push operation of the cruise operating unit 70 (FIG. 19), even if any value of the speed limit (the second speed limit Vlim2) is recognized in the middle of the long-push operation.

<Modification of First Function of Upward Direction>

Figure 10B:
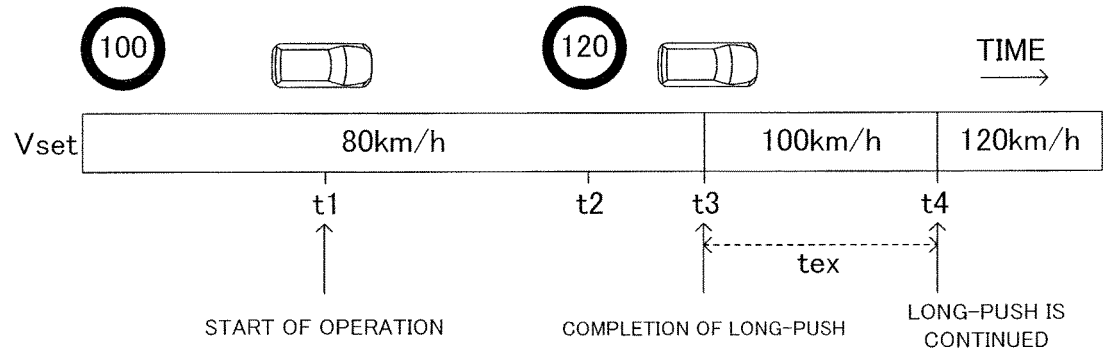
FIG. 10B is an explanatory drawing illustrating the first function of the upward direction according to a modified example.

In the above-described embodiment, when the speed limit is switched from the first speed limit Vlim1 (>Vset) to the second speed limit Vlim2 (>Vset) during the upward long-push operation of the cruise operating unit 70, the target speed is set to the second speed limit Vlim2 at the time when the long-push operation has been completed/confirmed. Instead, in this modified example, as illustrated in FIG. 10B, the target speed is once set to the first speed limit Vlim1 (=100 km/h>Vset) at the time (time t3) when the long-push operation has been completed/confirmed. Thereafter, when the push operation of the cruise operating unit 70 continues for a predetermined extension setting time tex or more (time t4), the target speed is set to the second speed limit Vlim2 (=120 km/h>Vset).

Figure 20:
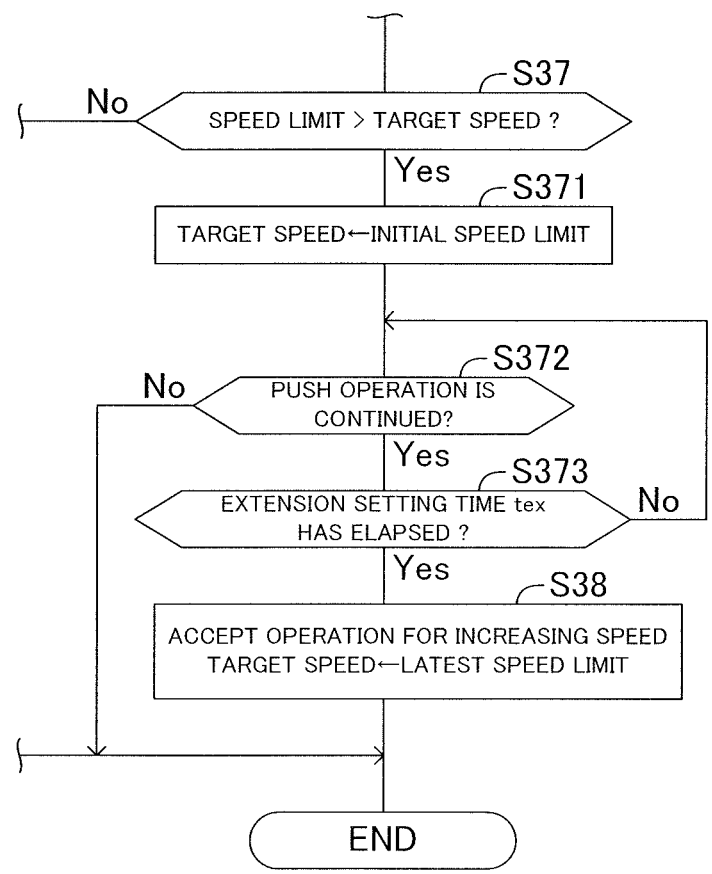
FIG. 20 is a flowchart illustrating a modified example of the upward operation correspondence process routine (a modified example of the first function of the upward direction).

FIG. 20 is a part of a flowchart showing processing according to this modification. In this modified example, the processes (S371 to S373) shown in FIG. 20 are added between step S37 and step S38 in FIG. 6. The added processes will be described below. When a "Yes" determination is made at step S37, the driving support ECU 10 sets the target speed to the initial speed limit (the first speed limit Vlim1 read in S31) recognized at the time of starting the push operation of the cruise operating unit 70 at step S371. In the example of FIG. 10B, the target speed is set to 100 km/h.

Subsequently, at step S372, the driving support ECU 10 determines whether or not the push operation of the cruise operating unit 70 is being continued. When the push operation of the cruise operating unit 70 is being continued, the driving support ECU 10 determines whether or not the push operation of the cruise operating unit 70 has continued for the extension setting time tex or more at step S373. The extension setting time tex is an arbitrary predetermined time (for example, substantially the same time as the long-push completion time). When the push operation of the cruise operating unit 70 is terminated before the push operation continues for the extension setting time tex or more (S372: No), the driving support ECU 10 tentatively ends the upward operation correspondence processing routine to return the process to the step S21.

On the other hand, when the push operation of the cruise operating unit 70 continues for the extension setting time tex or more (S373: Yes), the driving support ECU 10, at step S38, treats/regards this operation as the accept operation with respect to (for) the latest speed limit (the second speed limit Vlim2 read at S36) which had been recognized at the time when the long-push operation of the cruise operating unit was confirmed/completed. In this case, the driving support ECU 10 switches the target speed from the initial speed limit to the latest speed limit at step S38. In the example of FIG. 10B, the target speed is set to 120 km/h.

According to this modification, when and after the long-push operation of the cruise operating unit 70 has been confirmed/completed, the target speed is switched in the order of change of the speed limit during the period in which that long-push operation is continued. Therefore, it is possible to reduce discomfort on the driver.

<Modification of First Function of Downward Direction>

Figure 15B:
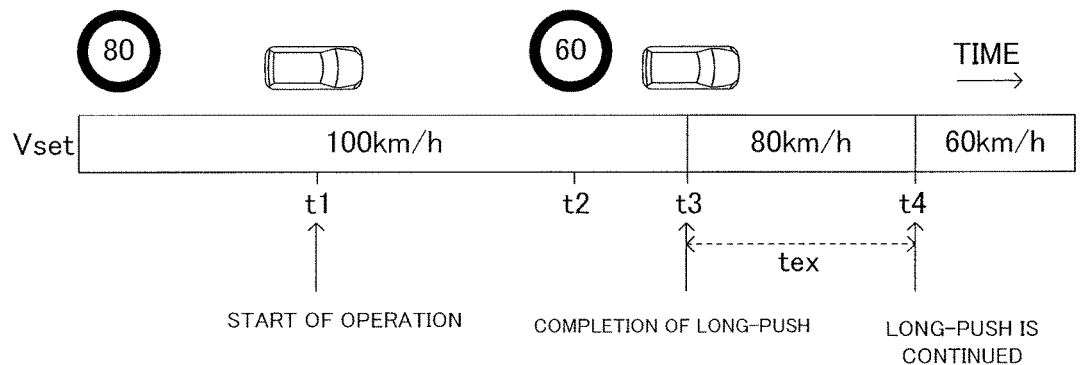
FIG. 15B is an explanatory drawing illustrating the first function of the downward direction according to a modified example.

In the above-described embodiment, when the speed limit is switched from the first speed limit Vlim1 (<Vset) to the second speed limit Vlim2 (<Vset) during the downward long-push operation of the cruise operating unit 70, the target speed is set to the second speed limit Vlim2 at the time when the long-push operation has been completed/confirmed. Instead, in this modified example, as illustrated in FIG. 15B, the target speed is once set to the first speed limit Vlim1 (=80 km/h<Vset) at the time (time t3) when the long-push operation has been completed/confirmed. Thereafter, when the push operation of the cruise operating unit 70 continues for the predetermined extension setting time tex or more (time t4), the target speed is set to the second speed limit Vlim2 (=60 km/h<Vset).

Figure 21:
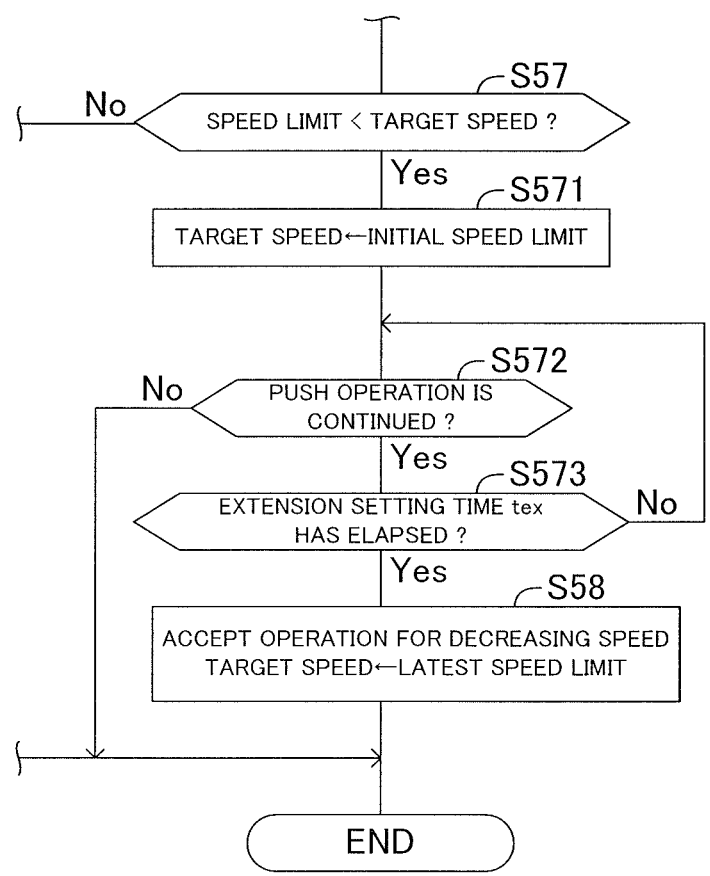
FIG. 21 is a flowchart illustrating a modified example of the downward operation correspondence process routine (a modified example of the first function of the downward direction).

FIG. 21 is a part of a flowchart showing processing according to this modification. In this modified example, the processes (S571 to S573) shown in FIG. 21 are added between step S57 and step S58 in FIG. 7. The added processes will be described below. When a "Yes" determination is made at step S57, the driving support ECU 10 sets the target speed to the initial speed limit (the first speed limit Vlim1 read in S51) recognized at the time of starting the push operation of the cruise operating unit 70 at step S571. In the example of FIG. 15B, the target speed is set to 80 km/h.

Subsequently, at step S572, the driving support ECU 10 determines whether or not the push operation of the cruise operating unit 70 is being continued. When the push operation of the cruise operating unit 70 is being continued, the driving support ECU 10 determines whether or not the push operation of the cruise operating unit 70 has continued for the extension setting time tex or more at step S573. When the push operation of the cruise operating unit 70 is terminated before the push operation continues for the extension setting time tex or more (S572: No), the driving support ECU 10 tentatively ends the downward operation correspondence processing routine to return the process to the step S21.

On the other hand, when the push operation of the cruise operating unit 70 continues for the extension setting time tex or more (S573: Yes), the driving support ECU 10, at step S58, treats/regards this operation as the accept operation with respect to (for) the latest speed limit (the second speed limit Vlim2 read at S56) which had been recognized at the time when the long-push operation of the cruise operating unit was confirmed/completed. In this case, the driving support ECU 10 switches the target speed from the initial speed limit to the latest speed limit at step S58. In the example of FIG. 15B, the target speed is set to 60 km/h.

According to this modification, when and after the long-push operation of the cruise operating unit 70 has been confirmed/completed, the target speed is switched in the order of change of the speed limit during the period in which the long-push operation is continued. Therefore, it is possible to reduce discomfort on the driver.

<Modification of Second Function of Upward Direction>

Figure 11B:
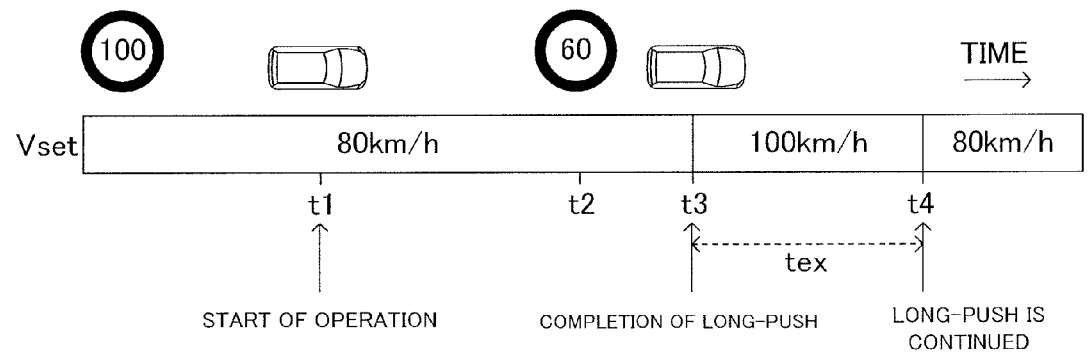
FIG. 11B is an explanatory drawing illustrating the second function of the upward direction according to a modified example.
Figure 12B:
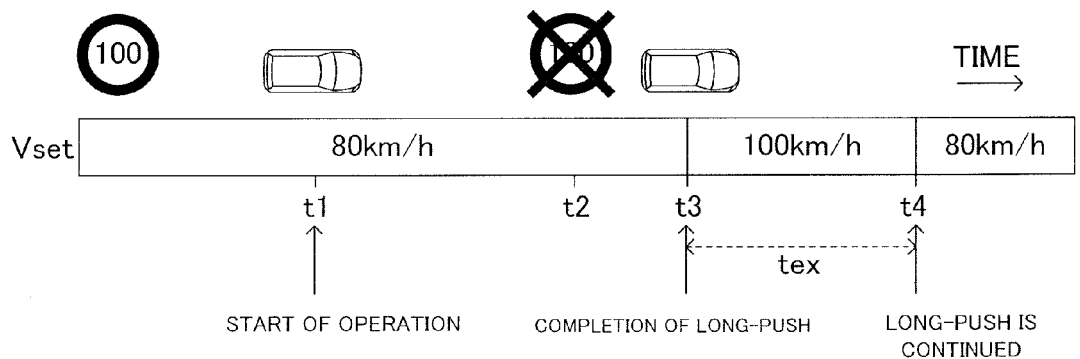
FIG. 12B is an explanatory drawing illustrating the second function of the upward direction according to a modified example.

In the above-described embodiment, the operation of the cruise operating unit 70 is invalidated, when the speed limit is switched from the first speed limit Vlim1 (>Vset) to the second speed limit Vlim2 (<Vset) during the upward long-push operation of the cruise operating unit 70, or when the state in which the first speed limit Vlim1 is recognized is switched to the unrecognized state during the upward long-push operation of the cruise operating unit 70. Instead, in this modified example, as illustrated in FIG. 11B and FIG. 12B, the target speed is once set to the first speed limit Vlim1 (=100 km/h>Vset) at the time (time t3) when the long-push operation has been confirmed/completed. Thereafter, when the push operation of the cruise operating unit 70 continues for the predetermined extension setting time tex or more (time t4), the target speed is returned to the previous target speed (Vset (=80 km/h) at the time of starting the push operation of the cruise operating unit 70).

Figure 22:
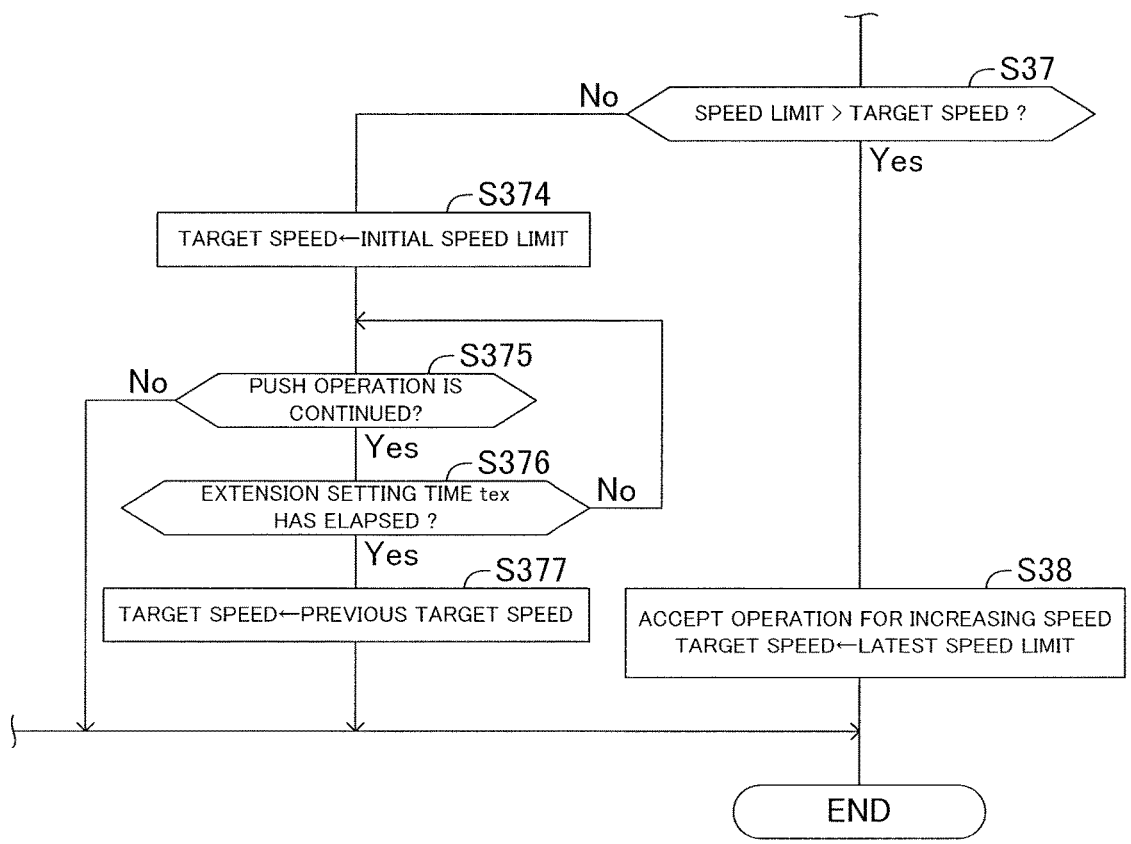
FIG. 22 is a flowchart illustrating a modified example of the upward operation correspondence process routine (a modified example of the second function of the upward direction).

FIG. 22 is a part of a flowchart showing processing according to this modification. In this modified example, the processes (S374 to S377) shown in FIG. 22 are implemented as substitute for step S39 shown in FIG. 6. The modified processes will be described below. When a "No" determination is made at step S37, the driving support ECU 10 sets the target speed to the initial speed limit (the first speed limit Vlim1 read at S31) recognized at the time of starting the push operation of the cruise operating unit 70 at step S374. In the examples of FIG. 11B and FIG. 12B, the target speed is set to 100 km/h.

Subsequently, at step S375, the driving support ECU 10 determines whether or not the push operation of the cruise operating unit 70 is being continued. When the push operation of the cruise operating unit 70 is being continued, the driving support ECU 10 determines whether or not the push operation of the cruise operating unit 70 has continued further for the extension setting time tex or more at step S376. When the push operation of the cruise operating unit 70 is terminated before the push operation continues for the extension setting time tex or more (S375: No), the driving support ECU 10 tentatively ends the upward operation correspondence processing routine to return the process to the step S21.

On the other hand, when the push operation of the cruise operating unit 70 continues for the extension setting time tex or more (S376: Yes), at step S377, the driving support ECU 10 returns the target speed to the previous target speed (Vset at the time of starting the push operation of the cruise operating unit 70).

Therefore, since the driver can determine the target speed depending on the long-push operation time, the convenience is improved.

Figure 11C:
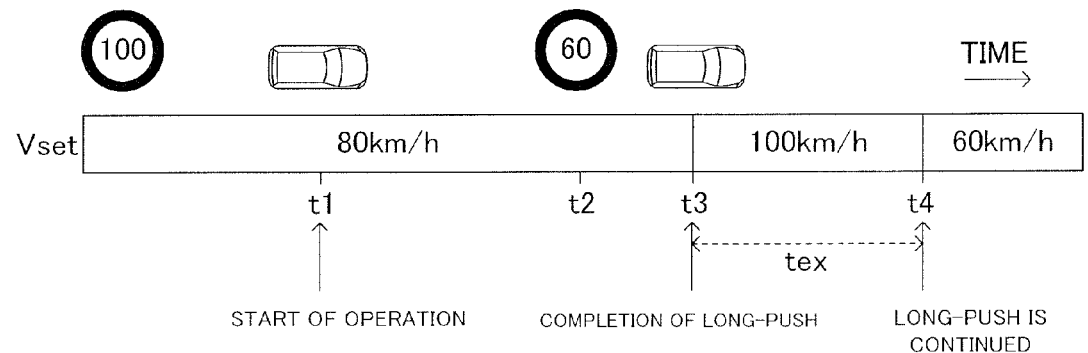
FIG. 11C is an explanatory drawing illustrating the second function of the upward direction according to a modified example.

Further, regarding the process of setting the target speed at step S377, instead of returning the target speed to the previous target speed, as illustrated in FIG. 11C, the target speed may be set to the latest speed limit (the second limit speed Vlim2, e.g., 60 km/h in the example of FIG. 11C). That is, the driving support ECU 10 may set the target speed to the latest speed limit at step S377. According to this configuration, it is possible to successfully reflect the intention of the driver to set the target speed to the latest speed limit. In a case where the speed limit cannot be recognized during the long-push operation, it is impossible to do so. In such a case, the target speed may be returned to the previous target speed (Vset at the time of starting the push operation of the cruise operating unit 70).

<Modification of Second Function of Downward Direction>

Figure 16B:
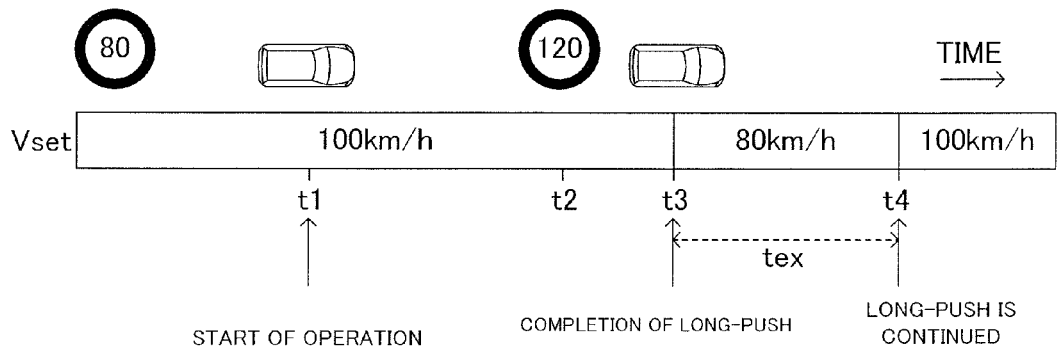
FIG. 16B is an explanatory drawing illustrating the second function of the downward direction according to a modified example.
Figure 17B:
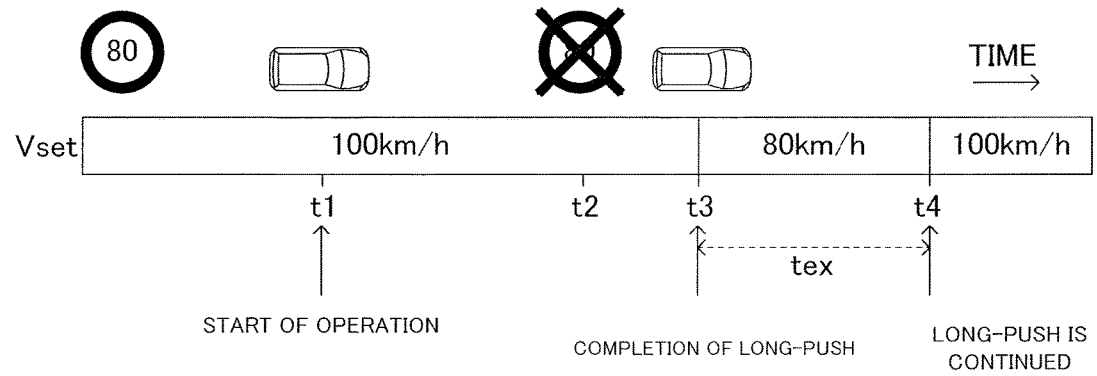
FIG. 17B is an explanatory drawing illustrating the second function of the downward direction according to a modified example.

In the above-described embodiment, the operation of the cruise operating unit 70 is invalidated, when the speed limit is switched from the first speed limit Vlim1 (<Vset) to the second speed limit Vlim2 (>Vset) during the downward long-push operation of the cruise operating unit 70, or when the state in which the first speed limit Vlim1 is recognized is switched to the unrecognized state during the downward long-push operation of the cruise operating unit 70. Instead, in this modified example, as illustrated in FIG. 16B and FIG. 17B, the target speed is once set to the first speed limit Vlim1 (=80 km/h<Vset) at the time (time t3) when the long-push operation has been confirmed/completed. Thereafter, when the push operation of the cruise operating unit 70 continues for the predetermined extension setting time tex or more (time t4), the target speed is returned to the previous target speed (Vset (=100 km/h) at the time of starting the push operation of the cruise operating unit 70).

Figure 23:
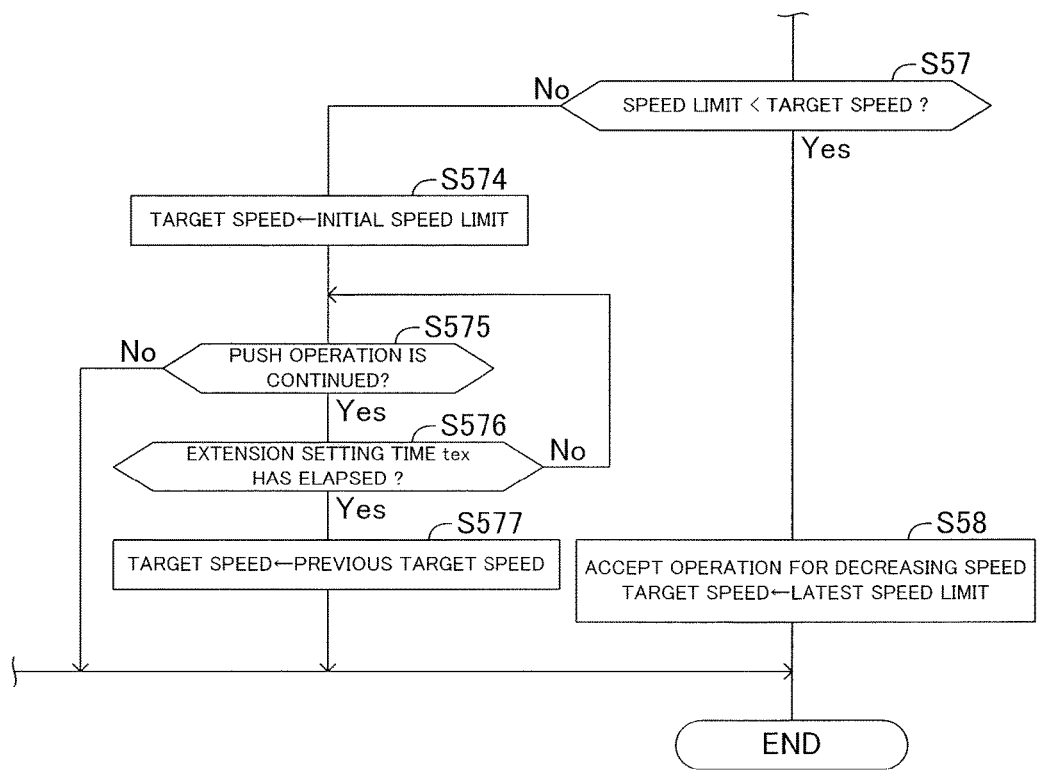
FIG. 23 is a flowchart illustrating a modified example of the downward operation correspondence process routine (a modified example of the second function of the downward direction).

FIG. 23 is a part of a flowchart showing processing according to this modification. In this modified example, the processes (S574 to S577) shown in FIG. 23 are implemented as substitute for step S59 shown in FIG. 7. The modified processes will be described below. When a "No" determination is made at step S57, the driving support ECU 10 sets the target speed to the initial speed limit (the first speed limit Vlim1 read at S51) recognized at the time of starting the push operation of the cruise operating unit 70, at step S574. In the examples of FIG. 16B and FIG. 17B, the target speed is set to 80 km/h.

Subsequently, at step S575, the driving support ECU 10 determines whether or not the push operation of the cruise operating unit 70 is being continued. When the push operation of the cruise operating unit 70 is being continued, the driving support ECU 10 determines whether or not the push operation of the cruise operating unit 70 has continued further for the extension setting time tex or more at step S576. When the push operation of the cruise operating unit 70 is terminated before the push operation continues for the extension setting time tex or more (S575: No), the driving support ECU 10 tentatively ends the downward operation correspondence processing routine to return the process to the step S21.

On the other hand, when the push operation of the cruise operating unit 70 continues for the extension setting time tex or more (S576: Yes), at step S577, the driving support ECU 10 returns the target speed to the previous target speed (Vset at the time of starting the push operation of the cruise operating unit 70).

Therefore, since the driver can determine the target speed depending on the long-push operation time, the convenience is improved.

Figure 16C:
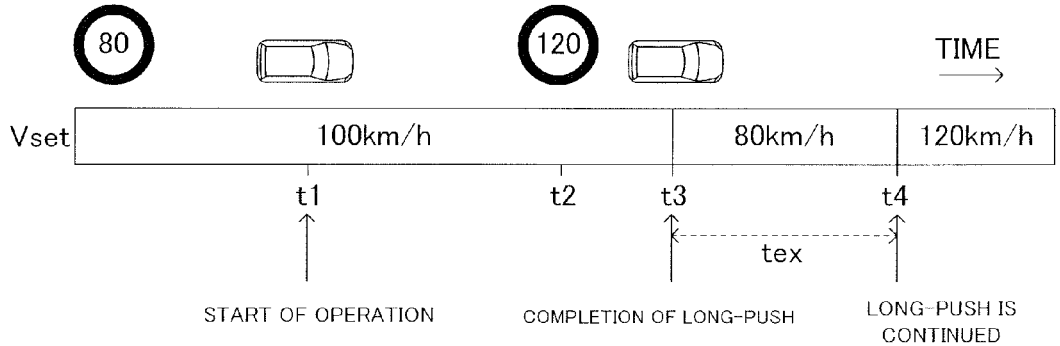
FIG. 16C is an explanatory drawing illustrating the second function of the downward direction according to a modified example.

Further, regarding the process of setting the target speed at step S577, instead of returning the target speed to the previous target speed, as illustrated in FIG. 16C, the target speed may be set to the latest speed limit (the second limit speed Vlim2, e.g., 120 km/h in the example of FIG. 16C). That is, the driving support ECU 10 may set the target speed to the latest speed limit at step S577. According to this configuration, it is possible to successfully reflect the intention of the driver to set the target speed to the latest speed limit. In a case where the speed limit cannot be recognized during the long-push operation, it is impossible to do so. In such a case, the target speed may be returned to the previous target speed (Vset at the time of starting the push operation of the cruise operating unit 70).

Although the vehicle traveling control apparatuses according to the embodiments and modifications are described as above, the present invention is not limited to the embodiments and modifications described above, and various modifications may be adopted within the scope of the present invention.

<Application to ASL>

The embodiments described as above is the vehicle traveling control apparatus configured to control a driving force and a braking force of the own vehicle so as to keep the own vehicle traveling at a constant speed in accordance with the speed limit. Instead of the embodiments, the present invention may be applicable to a vehicle traveling control apparatus which sets an upper vehicle speed limit that is an upper limit of the vehicle speed based on the speed limit, and controls the driving force and the braking force in such a manner that the vehicle speed does not exceed the upper vehicle speed limit. The vehicle traveling control apparatus in this modified example is a vehicle speed limiting apparatus which is referred to as an "ASL (Adjustable Speed Limiter)". In this modified example, the vehicle traveling control apparatus in FIG. 1 includes a driving support ECU 10' as substitute for the driving support ECU 10, and an ASL operating unit 70' as substitute for the cruise operating unit 70.

The driving support ECU 10' is connected to the ASL operating unit 70'. The ASL operating unit 70' includes the similar configuration to the cruise operating unit 70. The resume/speed-increasing switch 73 and the set/speed-reduction switch 74 are used for setting the upper speed limit in place of the target speed. Hereafter, the upper vehicle speed limit for the ASL is referred to as an "upper limit for ASL". In addition, the speed limit recognized by the speed limit acquisition ECU 20 is referred to as a "speed limit". The resume/speed-increasing switch 73 and the set/speed-reduction switch 74 are used to set the upper limit for ASL in the same manner as they are used to set the target speed in the above embodiments. Accordingly, the function of the ASL operating unit 70' can be understood by replacing the "target speed" in the description of the embodiments with the "upper limit for ASL", and thus, detailed descriptions of the unit 70' will be omitted. In this modified example, the mode switch 76 is not necessary.

For example, the tap-down operation (the downward short-push operation) of the ASL operating unit 70' functions to reduce the upper limit for ASL by a predetermined speed (for example, 1 km/h). The tap-up operation (the upward short-push operation) of the ASL operating unit 70' functions to increase the upper limit for ASL by a predetermined speed (for example, 1 km/h). Further, the coast operation (the downward long-push operation) of the ASL operating unit 70' functions to gradually reduce the upper limit for ASL at a predetermined speed interval (for example, 5 km/h). The acceleration operation (the upward long-push operation) of the ASL operating unit 70' functions to gradually increase the upper limit for ASL at a predetermined speed interval (for example, 5 km/h).

The driving support ECU 10' is an electronic control apparatus that determines the upper limit for ASL which is the upper limit of the running speed of the vehicle based on the speed limit output from the speed limit acquisition ECU 20 and a switch signal output from the ASL operating unit 70'. When the main switch 72 of the ASL operating unit 70' is in the ON state, the driving support ECU 10' executes the vehicle speed limiting control. On the other hand, when the main switch 72 of the ASL operating unit 70' is in the OFF state, the driving support ECU 10' does not execute the vehicle speed limiting control. In addition, the vehicle speed limiting control itself is performed by the engine ECU 30. Therefore, the driving support ECU 10' transmits to the engine ECU 30 information on the upper limit for ASL used for the vehicle speed limiting control to thereby have the engine ECU 30 execute the vehicle speed limiting control.

While the driving support ECU 10' transmits the upper limit for ASL to the engine ECU 30 every time a predetermined cycle elapses, the engine ECU 30 controls the driving force of the engine 31 in such a manner that the vehicle speed of the own vehicle does not exceed the upper limit for ASL. That is, the engine ECU 30 executes the vehicle speed limiting control. The engine ECU 30 calculates the driving force required by the driver based on the vehicle speed (referred to as an "actual vehicle speed") detected by a vehicle speed sensor (one of the sensors 33) and an accelerator pedal operation amount detected by an accelerator pedal sensor (one of the sensors 33). Then, the engine ECU 30 controls the engine 31 and the transmission 32 so as to generate the required driving force. In this case, when it is predicted that the actual vehicle speed exceeds the upper limit for ASL, the engine ECU 30 decreases the opening degree of a throttle valve that adjusts an intake air amount of the engine 31, or limits a fuel injection amount to the engine 31, or adjusts the gear ratio of the transmission 32, in such a manner that the actual vehicle speed does not exceed the upper vehicle speed limit. Further, when the required driving force has a value requiring a large braking force, and the engine 31 and the transmission 32 alone cannot satisfy the required driving force, the engine ECU 30 transmits information on the required braking force to the brake ECU 40 so as to compensate for the shortage by a hydraulic brake.

The ASL operating unit 70' is used not only for increasing/decreasing the upper limit for ASL, but also as an operating apparatus for permitting the driver to set the upper limit for ASL to the speed limit. When the ASL operating unit 70' is operated so as to authorize the driving support ECU 10' to set the upper limit for ASL to the speed limit, the driving support ECU 10' sets the upper limit for ASL to the speed limit recognized by the speed limit acquisition ECU 20.

The driving support ECU 10' transmits to the meter ECU 50 information on the current upper limit for ASL and information on the speed limit. When the upper limit for ASL and the speed limit are equal to each other, the meter ECU 50 displays a normal display screen indicating the upper limit for ASL on the display device 51 (i.e., a screen displaying the upper limit for ASL instead of the target speed on the normal display screen D1 in FIG. 3A) in accordance with the information transmitted from the driving support ECU 10'. On the other hand, when the upper limit for ASL and the speed limit are different from each other, the meter ECU 50 displays an inquiry display screen indicating the upper limit for ASL, the speed limit, and an accept direction mark (screen indicating the upper limit for ASL as substitute for the target speed on the inquiry display screen D2 in FIG. 3) on the display device 51.

When the main switch 72 is in the ON state, the driving support ECU 10' executes a display control routine and an ASL upper limit setting routine (including the upward operation correspondence processing routine and the downward operation correspondence processing routine). The display control routine in this example includes processes similar to the processes of the display control routine described above (FIG. 4) in which the "target speed" is replaced with the "upper limit for ASL", and the "cruise operating unit" is replaced with the "ASL operating unit". Further, the ASL upper limit setting routine includes processes similar to the processes of the target speed setting routine described above (FIGS. 5, 6, and 7) in which the "target speed" is replaced with the "upper limit for ASL", and the "cruise operating unit" is replaced with the "ASL operating unit". Therefore, detailed descriptions are omitted.

The driving support ECU 10' may execute modified routines of the upward operation correspondence processing routine and the downward operation correspondence processing routine. The modified routine of the upward operation correspondence processing routine includes processes similar to the processes of the upward operation correspondence processing routine described above (FIGS. 20 and 22) in which the "target speed" is replaced with the "upper limit for ASL", and the "cruise operating unit" is replaced with the "ASL operating unit". The modified routine of the upward operation correspondence processing routine includes processes similar to the processes of the downward operation correspondence processing routine described above (FIGS. 21, and 23) in which the "target speed" is replaced with the "upper limit for ASL", and the "cruise operating unit" is replaced with the "ASL operating unit". Therefore, detailed descriptions are omitted.

In the vehicle traveling control apparatus equipped with the ASL, even if the speed limit changes while the driver is conducting the long-push operation of the ASL operating unit 70', the driving support ECU 10' executes the above ASL upper limit setting routine so as to successfully reflect the intention of the driver on setting of the upper limit for ASL. Therefore, it is possible to reduce discomfort on the driver. Further, this prevents the upper limit for ASL from being set to the speed limit having a low degree of reliability. Accordingly, it is possible to reduce the inconvenience that the upper limit for ASL is set to an erroneous speed limit. Thus, it is possible to reduce discomfort on the driver.

<Other Modifications>

In the present embodiments, the accept operation directions are the upward direction and the downward direction, but they are not limited to such directions. For example, the accept operation directions may be other directions such as a left direction and a right direction viewed from the driver, or a front direction and a backward direction. In this case, when the speed limit is higher than the current target speed (or upper limit for ASL), it is preferable that the accept operation direction be set to the same direction as the operation direction of the operating unit 70 (70') for increasing the target speed (or upper limit for ASL). On the other hand, when the speed limit is lower than the current target speed (or upper limit for ASL), it is preferable that the accept operation direction be set to the same direction as the operation direction of the operating unit 70 (70') for decreasing the target speed (or upper limit for ASL). In addition, the accept operation direction is not necessarily set separately in two directions, and may be one direction.

Further, each of the vehicle traveling control apparatuses of the present embodiments is an apparatus that implements RSA-ACC, but may be an apparatus in which the inter-vehicle control function is omitted.

Further, the vehicle traveling control apparatus may be an apparatus which does not have the function (e.g., ACC or CC) allowing the driver to arbitrarily set the target speed, and simply sets the target speed to the speed limit to thereby keep the own vehicle traveling at a constant speed according to the speed limit. In this case, the operating unit 70 may be an operating apparatus for simply allowing the target speed to be set to the speed limit, and may not have the function of increasing/decreasing the target speed.

Similarly, the vehicle traveling control apparatus may be an apparatus which does not have the function allowing the driver to arbitrarily set the upper limit for ASL, and simply sets the upper limit for ASL to the speed limit to control the driving force and the braking force in such a manner that the vehicle speed does not exceed the speed limit. In this case, the operating unit 70' may be an operating apparatus simply allowing the upper limit for ASL to be set to the speed limit, and may not have the function of increasing/decreasing the upper limit for ASL.

In the present embodiments, when the speed limit and the target speed (or upper limit for ASL) are different from each other, the inquiry screen D2 is displayed on the display device 51. However, the vehicle traveling control apparatus may be a simplified apparatus which does not have such a display function.

Further, in the present embodiments, a lever type of the operating unit 70 (70') is adopted. However, it is not necessarily required that the operating unit 70 (70') is a lever type. The operating unit 70 (70') may be a button type, a sliding type, or other types, as long as the push operation can be performed. Further, the operating unit 70 (70') may be provided at a position that the driver can operate during driving, for example, at a pad portion of a steering handle.

Further, in the present embodiments, as illustrated in FIG. 8, the upward long-push operation of the cruise operating unit 70 when the second speed limit Vlim2 is higher than the target speed Vset is treated as the acceleration operation, unless the first speed limit Vlim1 is higher than the target speed Vset. However, it is not necessary to do so. For example, when the second speed limit Vlim2 is higher than the target speed Vset, the driving support ECU 10 may treat/regard the upward long-push operation of the cruise operating unit 70 as the accept operation, even in a case where the first speed limit Vlim1 is equal to or lower than the target speed Vset and/or the first speed limit Vlim1 is unrecognized. That is, all three cells on the right side of FIG. 8 may be "accept". Similarly, in the present embodiments, as illustrated in FIG. 9, when the second speed limit Vlim2 is lower than the target speed Vset, the downward long-push operation of the cruise operating unit 70 is treated as the coast operation unless the first speed limit Vlim1 is lower than the target speed Vset. However, it is not necessary to do so. For example, when the second speed limit Vlim2 is lower than the target speed Vset, the driving support ECU 10 may treat/regard the downward long-push operation of the cruise operating unit 70 as the accept operation even in a case where the first speed limit Vlim1 is equal to or higher than the target speed Vset and/or the first speed limit Vlim1 is unrecognized. That is, all three cells on the right side of FIG. 9 may be "accept". According to this configuration, when the driver takes a look at a road sign indicating the second speed limit Vlim2 and performs the long-push operation of the cruise operating unit 70, the operation is treated as the accept operation, and therefore, it is possible to reduce discomfort on the driver.

What is claimed is:

1. A vehicle traveling control apparatus comprising:
   a travel controlling device configured to control a driving force and a braking force of an own vehicle so as to keep the own vehicle traveling at a constant speed in accordance with a target speed without an accelerator pedal operation by a driver;
   a speed limit acquisition device configured to acquire a speed limit of a road on which the own vehicle travels;
   an operating unit configured to be operated by the driver; and
   a target speed setting unit configure to set the target speed to the speed limit when a long-push operation which is a push operation of the operating unit continued for a long-push completion time or more is detected in a situation in which the speed limit acquired by the speed limit acquisition device and the current target speed are different from each other, wherein
   the target speed setting unit comprises a speed limit selecting unit configured to select,
      when the speed limit acquired by the speed limit acquisition device is switched from a first speed limit to a second speed limit in a period in which a push operation of the operating unit is being detected and a duration time of the push operation has not yet reached the long-push completion time,
      the second speed limit to set the target speed to the second speed limit at a time point at which the duration time of the push operation has reached the long-push completion time, thereafter,
   the travel controlling device comprises a cruise control function for keeping the own vehicle traveling at the constant speed in accordance with the target speed set arbitrarily by the driver,
   the operating unit serves as both a target speed setting operating unit for increasing or decreasing the target speed for the cruise control function by a push operation, and a permission operating unit for permitting setting the target speed to the speed limit by the long-push operation,
   when the operating unit is used as the target speed setting operating unit for the cruise control function, the operating unit includes:
      a function to gradually increase the target speed as long as the push operation is continuing after the long-push operation for the long-push completion time is detected, with respect to the long-push operation toward a side for increasing the target speed for the cruise control function; and a function to gradually decrease the target speed as long as the push operation is continuing after the long-push operation for the long-push completion time is detected, with respect to the long-push operation toward a side for decreasing the target speed for the cruise control function, and when the first speed limit is lower than the current target speed and the long-push operation toward the side for increasing the target speed for the cruise control function is detected, even in a case where the second speed limit is higher than the current target speed, the target speed setting unit is configured to prohibit the speed limit selecting unit from setting the target speed to the second speed limit, and to gradually increase the target speed from the current target speed as long as the push operation is continuing after the long-push operation for the long-push completion time is detected.

2. The vehicle traveling control apparatus according to claim 1, wherein, the target speed setting unit is configured to prohibit the speed limit selecting unit from setting the target speed to the second speed limit, when the second speed limit is lower than the current target speed and the long-push operation of the operating unit toward the side for increasing the target speed for the cruise control function is detected.

3. The vehicle traveling control apparatus according to claim 2, wherein, in a case where the first speed limit is higher than the current target speed and the second speed limit is lower than the current target speed, when the long-push operation of the operating unit toward the side for increasing the target speed for the cruise control function is detected, the target speed setting unit is configured to set the target speed to the first speed limit, and thereafter, when the push operation of the operating unit continues for a predetermined extension time or more, the target speed setting unit is configured to set the target speed to the second speed limit.

4. The vehicle traveling control apparatus according to claim 1, wherein, the target speed setting unit is configured to prohibit the speed limit selecting unit from setting the target speed to the second speed limit, when the second speed limit is higher than the current target speed and the long-push operation of the operating unit toward a side for decreasing the target speed for the cruise control function is detected.

5. The vehicle traveling control apparatus according to claim 4, wherein, in a case where the first speed limit is lower than the current target speed and the second speed limit is higher than the current target speed, when the long-push operation of the operating unit toward the side for decreasing the target speed for the cruise control function is detected, the target speed setting unit is configured to set the target speed to the first speed limit, and thereafter, when the push operation of the operating unit continues for a predetermined extension time or more, the target speed setting unit is configured to set the target speed to the second speed limit.

6. The vehicle traveling control apparatus according to claim 5, wherein, when the first speed limit is higher than the current target speed and the long-push operation toward the side for decreasing the target speed for the cruise control function is detected, even in a case where the second speed limit is lower than the current target speed, the target speed setting unit is configured to prohibit the speed limit selecting unit from setting the target speed to the second speed limit, and to gradually decrease the target speed from the current target speed as long as the push operation is continuing after the long-push operation for the long-push completion time is detected.

7. The vehicle traveling control apparatus according to claim 4, wherein, when the first speed limit is higher than the current target speed and the long-push operation toward the side for decreasing the target speed for the cruise control function is detected, even in a case where the second speed limit is lower than the current target speed, the target speed setting unit is configured to prohibit the speed limit selecting unit from setting the target speed to the second speed limit, and to gradually decrease the target speed from the current target speed as long as the push operation is continuing after the long-push operation for the long-push completion time is detected.

8. The vehicle traveling control apparatus according to claim 1, further comprising reliability-degree determining unit configured to determine whether or not a degree of reliability of the speed limit acquired by the speed limit acquisition device is lower than a reference level, wherein in a case where it is determined that the degree of reliability of the speed limit is lower than the reference level in a period in which the push operation of the operating unit is being detected and the duration time of the push operation has not yet reached the long-push completion time, the target speed setting unit is configured to invalidate the long-push operation of the operating unit when the duration time of the push operation has reached the long-push completion time, thereafter.

9. The vehicle traveling control apparatus according to claim 1, wherein, when a magnitude relationship of the first speed limit with respect to the current target speed and a magnitude relationship of the second speed limit with respect to the current target speed are different from each other, the target speed setting unit is configured to prohibit the speed limit selecting unit from setting the target speed to the second speed limit.

10. A vehicle traveling control apparatus comprising:
a travel controlling device configured to control a driving force and a braking force of an own vehicle in such a manner that a vehicle speed of the own vehicle does not exceed an upper speed limit;
a speed limit acquisition device configured to acquire a speed limit of a road on which the own vehicle travels;
an operating unit configured to be operated by the driver; and
an upper speed limit setting unit configured to set the upper speed limit to the speed limit when a long-push operation which is a push operation of the operating unit continuing for a long-push completion time or more is detected, in a situation in which the speed limit acquired by the speed limit acquisition device and the current upper speed limit are different from each other, wherein the upper speed limit setting unit comprises a speed limit selecting unit configured to select,
when the speed limit acquired by the speed limit acquisition device is switched from a first speed limit to a second speed limit in a period in which a push operation of the operating unit is being detected and a duration time of the push operation has not yet reached the long-push completion time,
the second speed limit to set the upper speed limit to the second speed limit at a time point at which the duration time of the push operation has reached the long-push completion time, thereafter,
the operating unit includes:
a function to gradually increase the upper speed limit as long as the push operation is continuing after the long-push operation for the long-push completion time is detected, with respect to the long-push operation toward a side for increasing the upper speed limit; and
a function to gradually decrease the upper speed limit as long as the push operation is continuing after the long-push operation for the long-push completion time is detected, with respect to the long-push operation toward a side for decreasing the upper speed limit, and
when the first speed limit is lower than the current upper speed limit and the long-push operation toward the side for increasing the upper speed limit is detected, even in a case where the second speed limit is higher than the current upper speed limit, the upper speed limit setting unit is configured to prohibit the speed limit selecting unit from setting the upper speed limit to the second speed limit, and to gradually increase the upper speed limit from the current upper speed limit as long as the push operation is continuing after the long-push operation for the long-push completion time is detected.

* * * * *